United States Patent [19]

Aihara et al.

[11] Patent Number: 5,274,798
[45] Date of Patent: Dec. 28, 1993

[54] ELECTRONIC APPARATUS WITH COMMUNICATION FUNCTION HAVING POWER SOURCE SYSTEM WITH TWO VOLTAGE OUTPUT LEVELS

[75] Inventors: Fumikazu Aihara, Tokyo; Toshiharu Aihara, Ome; Takashi Yamasaki, Higashiyamato; Eiji Nakazawa, Akishima, all of Japan

[73] Assignee: Casio Computer Co., Ltd., Tokyo, Japan

[21] Appl. No.: 618,106

[22] Filed: Nov. 26, 1990

[30] Foreign Application Priority Data

Nov. 28, 1989 [JP] Japan .................. 1-137390[U]
Dec. 4, 1989 [JP] Japan .................. 1-140361[U]
Dec. 25, 1989 [JP] Japan .................. 1-149099[U]
Dec. 28, 1989 [JP] Japan .................. 1-152908[U]
Jan. 30, 1990 [JP] Japan .................. 2-7012[U]

[51] Int. Cl.⁵ .................. G06F 1/04; G06F 1/26
[52] U.S. Cl. .................. 395/575; 364/260.1;
364/270; 364/271.1; 364/DIG. 1; 395/800; 395/750
[58] Field of Search .......... 395/800, 575, 750; 235/492; 364/200, 558; 368/204, 80; 375/114

[56] References Cited

U.S. PATENT DOCUMENTS

| 4,361,409 | 11/1982 | Sutter | 368/80 |
| 4,397,563 | 8/1983 | Ichinose | 368/204 |
| 5,017,766 | 5/1991 | Tamada et al. | 235/492 |
| 5,086,438 | 2/1992 | Sugata et al. | 375/114 |
| 5,133,064 | 7/1992 | Hotta et al. | 364/200 |
| 5,148,376 | 9/1992 | Sato | 364/558 |

Primary Examiner—Robert B. Harrell
Assistant Examiner—Meng-Ai T. An
Attorney, Agent, or Firm—Frishauf, Holtz, Goodman & Woodward

[57] ABSTRACT

In a normal state, a time counting process and a key input process are performed in accordance with an oscillation signal of 38.4 KHz generated by a crystal oscillator. In a data communication mode, a process for exchanging data with an external appliance is performed in accordance with a frequency-divided signal of the above oscillation signal and received data are stored in a memory simultaneously in a high speed process under control of an oscillation signal of 800 KHz generated by a CR oscillator. A power source circuit provides a high power source voltage, preventing all circuits from a defective operation while the high speed process is performed since the high speed process can decrease a power source voltage.

13 Claims, 24 Drawing Sheets

| | | 49 |
|---|---|---|
| NAME | 1 | |
| PRONUNCIATION | 0 | |
| TEL | 1 | |
| ADDRESS | 0 | |
| MEMORANDUM | 0 | |

FIG. 21

ELECTRONIC APPARATUS WITH COMMUNICATION FUNCTION HAVING POWER SOURCE SYSTEM WITH TWO VOLTAGE OUTPUT LEVELS

BACKGROUND OF THE INVENTION

1. Field of the Invention

The present invention relates to an electronic apparatus having a function of communication, which is capable of transferring and/or receiving various data to other electronic apparatus such as personal computers and word processors.

2. Description of the Prior Art

In recent, various kinds of electronic apparatus such as electronic note books, personal computers and word processors are on the market which are capable of storing and displaying personal schedule data, phone number data including names, address and phone numbers, name card data bearing a company name in addition to phone number data and free data of memorandums, and are capable of displaying these stored data in need. Each of these electronic apparatus has an internal memory and some of them have data-communication function for transferring and/or receiving data to other apparatus electrically connected therewith.

Application of the communication function to such small sized electronic apparatus as electronic timepieces may encounter various difficulties in a power voltage and a clock frequency. For example, in a conventional electronic wrist watch, a frequency of its crystal oscillator is 32,768 ($2^{15}$)Hz and therefore a time counting signal of 1 Hz is obtained by dividing the frequency 32,768 Hz by 15.

In general, transferring speeds of data-communication, for instance, the transferring speeds specified in the RS-232-C Interface Standard are 300, 600, 1200, 2400, 4800, 9600 and 19200 [bps], which numerals are obtained from an expression $300 \times 2^n$. Reference signals which are in synchronism with the above transferring speeds are needed for data communication. Even though a signal of 32,768 Hz is divided, however, it is very hard to obtain a reference signal which is synchronism with the data transferring speed with a high precision. Accordingly, an oscillator for data communication is necessary in addition to the crystal oscillator used in an electronic wrist watch to obtain a reference signal of a high precision, which is disadvantageous in assembling a small sized electronic apparatus.

Further, another transferring speed expressed by $75 \times 2^n$ is used for data communication but when for example data is received and stored in a memory, a clock signal of a frequency which is higher than the transferring speed must be used or a much longer time is required for processing data. If the above clock signal of a high frequency is employed for processing data within a short time, a current consumption is increased, resulting in a defect which shortens a battery life in a small sized electronic apparatus which is driven with a battery.

Particularly in an electronic apparatus having communication function, a random access memory (RAM) of a much capacity is employed for storing a number of externally supplied data but this kind of RAM usually needs much current consumption to access data at a high speed. As a result, voltage drop of the battery is occurred during operation, inviting malfunction of electronic circuits or defective operation of a communication system.

SUMMARY OF THE INVENTION

The present invention has been made to remove the above mentioned drawbacks of electronic apparatus and its object is to provide a small sized electronic apparatus having communication function, which comprises an oscillator which is capable of generating a clock signal as well as a reference signal of a precise frequency.

Another object of the invention is to provide an electronic apparatus in which electronic circuits are prevented from malfunctioning and much power consumption is avoided even though RAM of a large capacity is employed therein for storing data.

In order to achieve the above objects, the present invention provides an electronic apparatus with a communication function that is capable of receiving and storing data delivered from an external appliance in its memory, which electronic apparatus comprises:

first oscillation means for generating an oscillation signal of a frequency $300 \times 2^n$ (n=0, 1, 2, 3, ... ), second oscillation means for generating an oscillation signal of a frequency higher than that of the oscillation signal generated by said first oscillation means;

first divider means for producing a first clock pulse signal by dividing the oscillation signal generated by said first oscillation means;

second divider means for producing a second clock pulse signal for controlling data communication by dividing the oscillation signal generated by said first oscillation means;

communication means for receiving data delivered from the external appliance in accordance with the second clock pulse signal produced by said second divider means;

control means for normally performing a control operation in accordance with the first clock pulse signal and for performing an operation to store data received by said communication means in its memory in accordance with the oscillation signal of the higher frequency generated by said second oscillation means; and power source circuit means for normally providing a first power source voltage and for providing a second power source voltage while said second oscillation means is generating the oscillation signal of the higher frequency, said second power source voltage being higher that the first power source voltage.

In the apparatus having the above construction, a single oscillation circuit means generates both a time counting signal and a precise reference signal for data communication. Therefore, the electronic apparatus can be made compact in size and consumes a little power since a particular oscillator only for data communication is not required.

BRIEF DESCRIPTION OF THE DRAWINGS

The above and other objects, features and advantages of the present invention will become more readily apparent from the following description, reference being made to the accompanying drawings in which:

FIGS. 12 through 21 are views showing a second embodiment of the present invention;

FIG. 12 is a plane view showing an external view of an electronic wrist watch embodying the second embodiment of the invention;

FIG. 13 is a side view of the electronic wrist watch of FIG. 12;

FIG. 14 is a block diagram showing a circuit construction of the electronic wrist watch of FIG. 12;

FIG. 15 is a view showing a construction of a memory area of RAM shown in FIG. 14;

FIG. 16 is a view showing a fundamental format of a data clock which is received and/or transferred by the electronic wrist watch of FIG. 12;

FIG. 18 is a flow chart showing an overall operation of a data process;

FIG. 19 is a flow chart showing operation of a data receiving process of FIG. 18;

FIG. 20 is a flow chart showing operation of a key process of FIG. 18;

FIG. 21 is a view showing an example of an indication displayed when data items are set;

FIG. 22 is a view showing a construction of a memory area of RAM used in the third embodiment;

FIG. 23 is a flow chart showing a detailed operation of a data receiving process;

FIGS. 24 and 25 are views showing indications displayed on a display section;

FIG. 26 is a plane view showing an external view of an electronic wrist watch embodying the forth embodiment of the invention;

FIG. 27 is a view showing a construction of a memory area of RAM used in the forth embodiment;

FIG. 28 is a flow chart showing an overall operation of a data process;

FIG. 29 is a flow chart showing operation of a data receiving process of FIG. 28; and FIG. 30 is a flow chart showing operation of a key process of FIG. 28.

DETAILED DESCRIPTION OF THE PREFERRED EMBODIMENTS

The present invention will be described in detail with reference to the accompanying drawings.

First Embodiment

Figure 1:
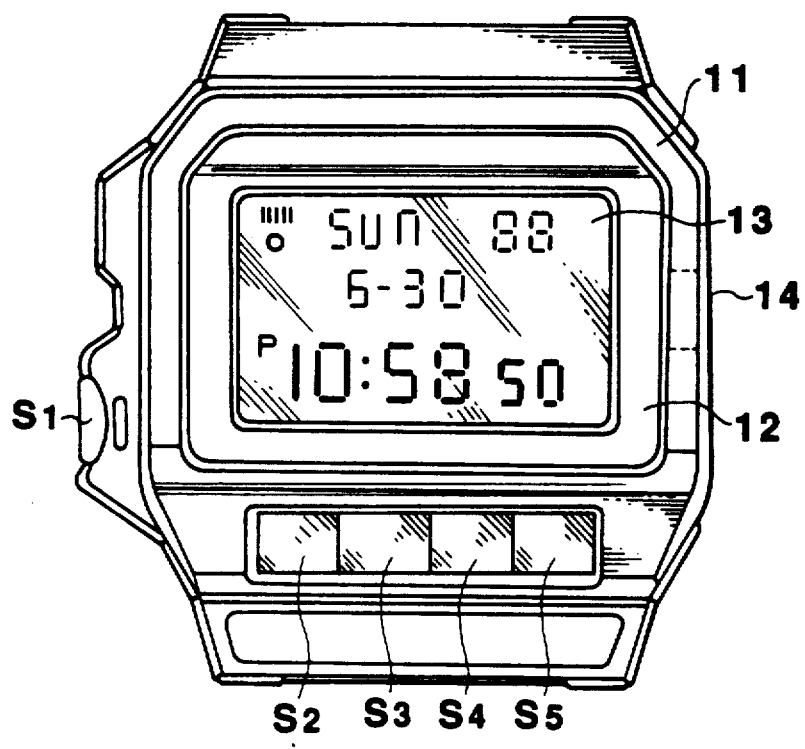
FIG. 1 is a plane view showing an external construction of an electronic wrist watch employing an apparatus according to the invention.
Figure 2:
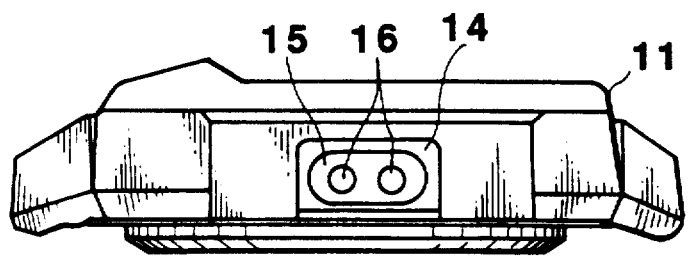
FIG. 2 is a side view showing the electronic waist watch of FIG. 1.

FIGS. 1 and 2 are views showing an external appearance of an electronic wrist watch embodying an apparatus according to the present invention. A numeral 11 stands for a casing of the wrist watch. The watch casing 11 is made of, for example, stainless steel or synthetic resin and on the front surface of the watch casing there is provided a watch glass 12 as shown in FIG. 1. Further, underneath the watch glass 12, there is provided a liquid crystal display device 13 of a dot matrix type. A push button S1 is mounted in the left side of the watch casing 11 and push buttons S2 through S5 for data communication and the like operation are arranged at lower side to the watch glass 12. At right side of the watch casing 11 there is formed a connector portion 14 for sending and/or receiving data from other electronic apparatus. The connector portion 14 is provided with two connecting terminals of two pins 16 in an oval recess 15 as clearly shown in FIG. 2.

Figure 3:
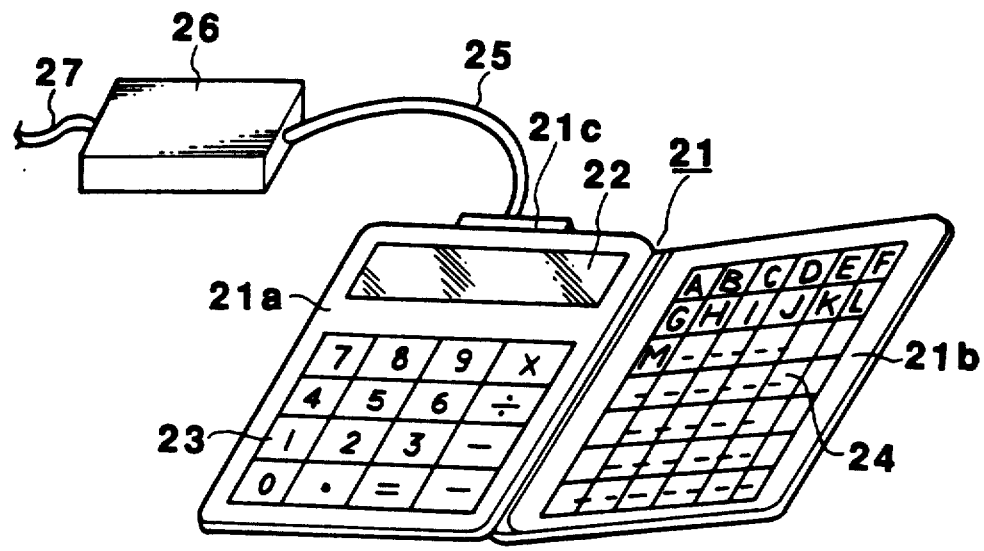
FIG. 3 is a perspective view showing an external view of an electronic note book, which is connected to the electronic wrist watch of FIG. 1.

FIG. 3 is a view showing an electronic note book 21, which is allowed to be connected with the above connector portion 14 of the wrist watch. The electronic note book 21 has calculation function and also comprises phone number memory for storing phone number data, schedule memory for storing schedule data and memorandum memory for storing comment data and memorandum data. The electronic note book 21 consists of a left casing 21a and a right casing 21b, which are combined in unit and it is of a size to be carried in hand when these left and right casing are folded. FIG. 3 is a view showing the electronic note book 21 with both casings 21a and 21b opened. On the left casing 21a of the electronic note book 21 there are provided a liquid crystal display section 22 of a dot matrix type and numeric/function keys 23. On the right casing 21b there are provided character keys 24. Phone number data, schedule data and memorandum data are entered by using these numeric/function keys 23 and character keys 24. At the top of the casing 21a there is provided a connector portion 21c, which is connected to an interface 26 through a cable 25. The interface 26 functions to convert a data signal supplied through the cable from the electronic note book 21 into a signal, for example, in conformity with the RS-232C Interface Standard. A cable 27 is connected to the connector portion 14 of the watch casing 11 through a jack 36 provided at the end of the cable 27. The converted signal is supplied to the wrist watch from the interface 26 through the cable 27.

Figure 4:
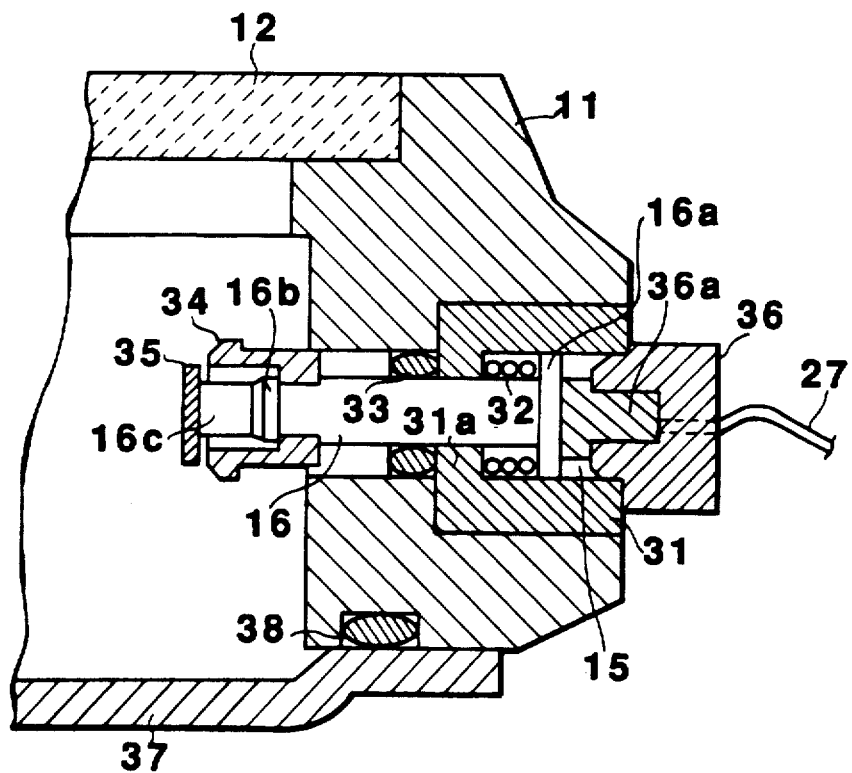
FIG. 4 is a sectional view showing a construction of a connector portion 14 of the electronic wrist watch.

FIG. 4 is a view showing a detailed construction of the connector portion 14 of the wrist watch.

In FIG. 4, the elongated recess 15 is formed with a pipe 31 of a synthetic resin, which pipe has a bottom 31a with an opening. The pipe is mounted in side portion of the casing 11 of the wrist watch. The above pin 16 penetrates through the opening of the bottom 31a. The pin 16 is provided with a flange 16a at its one end close to the pipe end 31. The pin 16 is inserted into a coil spring 32 which is disposed between the flange 16a and the bottom 31a in the pipe 31. There is provided a water proof packing 33 at an outer surface of the bottom 31a. The pin 16 penetrates through the water proof packing 33 and the pin 16 forms a retaining potion 16b on its opposite end portion, to which retaining portion 16b a retainer 34 is engaged. The opposite end 16c of the pin 16 faces to a terminal 35 which is electrically connected to electronic circuit on a circuit board installed in the casing 11 of the wrist watch. When nothing is inserted into the elongated recess 15 of the pipe 31, the flange 16a of the pin 16 stays on the same plane as the external surface of the watch casing 11 and the pipe end 31, allowing the opposite end 16c of the pin 16 to be apart from the terminal 35. When a jack terminal 36a of the jack 36 connected to one end of the cable 27 is inserted into the elongated recess 15 of the pipe 31, the inserted jack terminal 36a presses the pin 16 in the leftwards as seen in FIG. 4 against the influence of the coil spring 32, allowing the opposite end 16c of the pin 16 to be in contact with the terminal 35.

A numeral 37 denotes a rear cover of the casing 11 of the wrist watch and a numeral 38 denotes a water proof ring which is provided between the casing 11 and the rear cover 37 to keep an air tight state.

Figure 5:
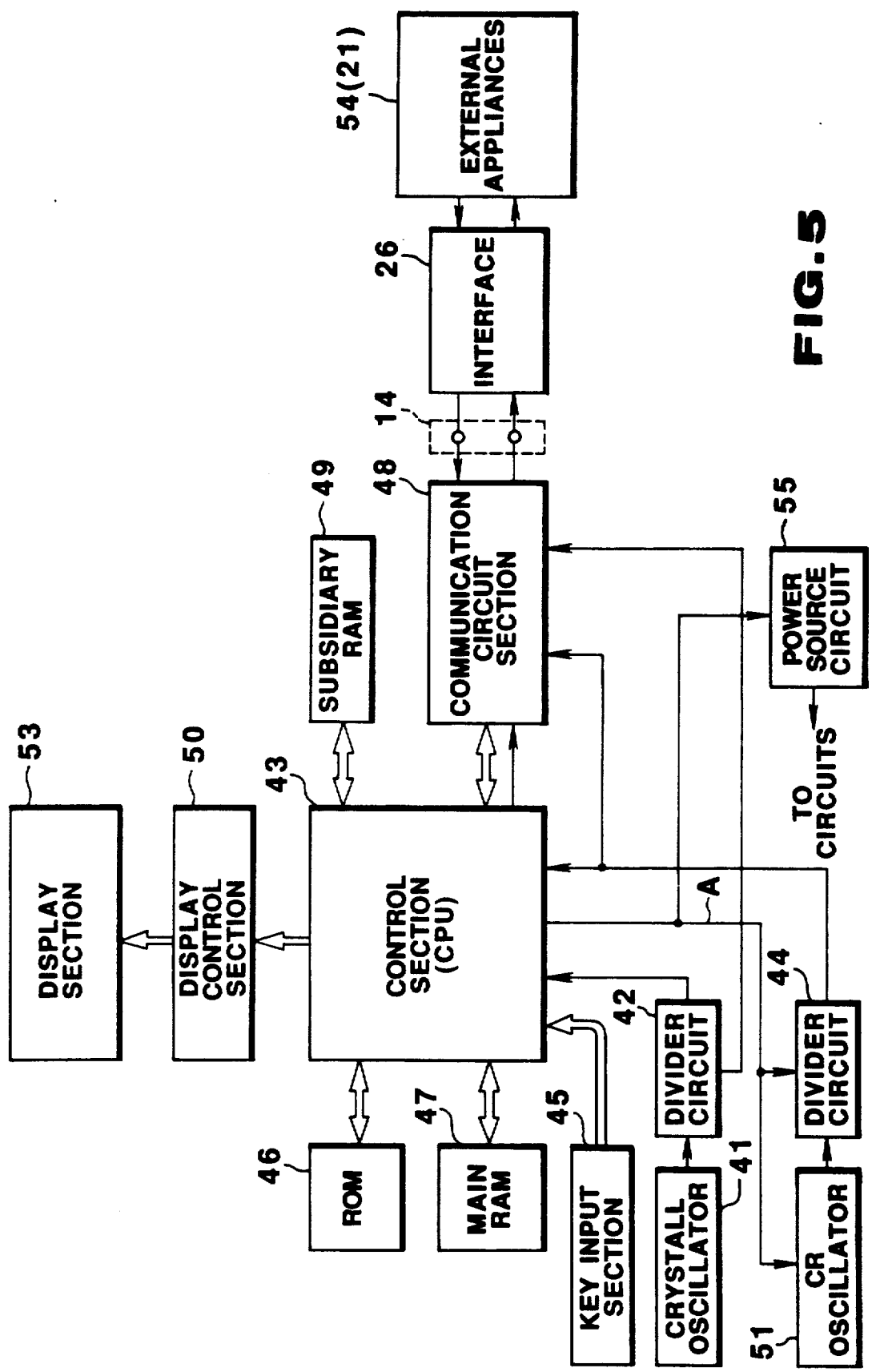
FIG. 5 is a block diagram showing a circuit construction of the electronic wrist watch.

A circuit construction mounted in the casing 11 of the wrist watch is shown in FIG. 5. In FIG. 5, a numeral 41 stands for a crystal oscillator, which generates a clock pulse signal of 38.4 KHz. This clock pulse signal serves as a reference signal for a clock and for various operations of the electronic circuit. The clock pulse signal of the crystal oscillator 41 is divided by a divider circuit 42. The divided signal is transferred to a control section 43 comprising of CPU and to a communication circuit section 48, which will be described later in detail. In accordance with the clock pulse signal supplied from the divider circuit 42, the control section 43 performs a time counting process to count a present time and a control process to control operations of other circuits in response to key input signals entered by a key input section 45 comprising of push button switches S1 through S5. The control section 43 reads out a microprogram from ROM 46 for controlling operations of the electronic circuits by addressing ROM 46, while the control section 43 reads and writes data to a main RAM 47 of a large capacity, for example, 512 Kbits or 1 Mbits for storing data by addressing the main RAM 47. The control section 43 transfers and receives data from the communication circuit section 48 and a subsidiary 16 Kbits, while it supplies display data to a display control section 50 and also supplies instruction signals A to a CR oscillator 51, a divider circuit 44 and a power source circuit 55, respectively. The display control section 50 generates a display driving signal on the basis of the display data supplied from the control section 43 and supplies the display driving signal to a display section 53 comprising of the liquid crystal display 13 to display time data and communication data.

The CR oscillator 51 comprises resisters and condensers and is combined with the control section 43, ROM 46, the main RAM 47, the communication circuit section 48 and the subsidiary RAM 49 into a unit, that is, into an LSI. This CR oscillator generates a clock pulse signal of a frequency, for example, 800 KHz that is much higher than that of the clock pulse signal generated by the crystal oscillator 41. The clock pulse signal of 800 KHz is divided into a signal of 400 KHz by the divider circuit 44 and is supplied to the control section 43. For instance in the communication mode, the control section 43 performs communication process depending on the signal of 400 KHz in place of the clock pulse signal from the divider circuit 42.

The communication circuit section 48 is connected to the interface circuit 26 through the connector portion 14 and it transfers and receives data from external appliances 54 such as the electronic note book 21 through the interface circuit 26. Though a detailed circuit construction of the external appliances 54 is not illustrated, the external appliances comprise CPU, ROM, RAM and a communication circuit and are almost of a similar circuit construction to the electronic circuit of the wrist watch of FIG. 5. Data generated by the external appliances 54 are transferred through the interface circuit 26 and connector portion 14 to the communication circuit section 48, and then the data are temporarily stored in the subsidiary RAM 49 and thereafter are stored in the main RAM 47.

Figure 6:
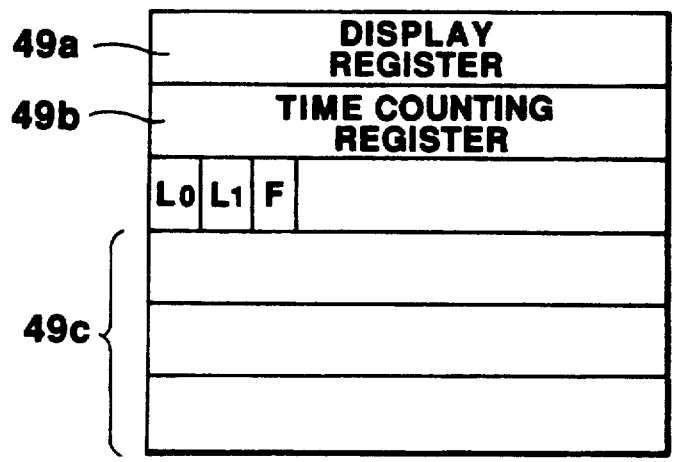
FIG. 6 is a view showing a construction of a memory area of a subsidiary RAM 49 shown in FIG. 5.

FIG. 6 is a view showing a detailed construction of the subsidiary RAM 49. As shown in FIG. 6, the subsidiary RAM 49 comprises a display register 49a, time counting register 49b, flag registers L0, L1 and F and a register 49c for temporarily storing communication data. The display register 49a serves to hold display data which the display control section 50 displays on the display section 53. The time counting register 49b serves to hold present time data which are counted, for instance, every 1/16 seconds by the control section 43. The register L0 stores data which is converted to "1" from "0", or to "0" from "1" by every operation of the switch S2 and it stores "1" in a receiving mode. Similarly, the register L1 stores data which is inverted by operation of the switch S3 and it stores "1" in a transmitting mode. The register F stores data which is inverted by operation of the switch S4 and it is set to a flag "1" in a data communication operation.

Figure 7:
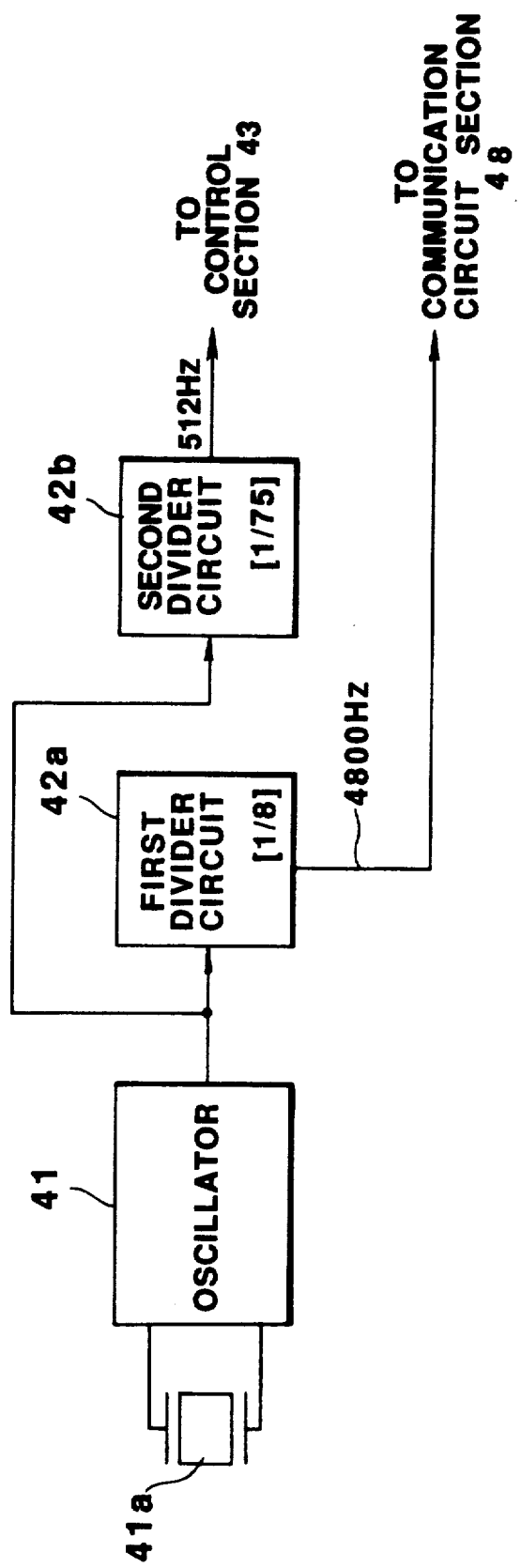
FIG. 7 is a block diagram showing a detailed circuit construction of a crystal oscillator 41 and a divider circuit 42 both shown in FIG. 5.
Figure 8:
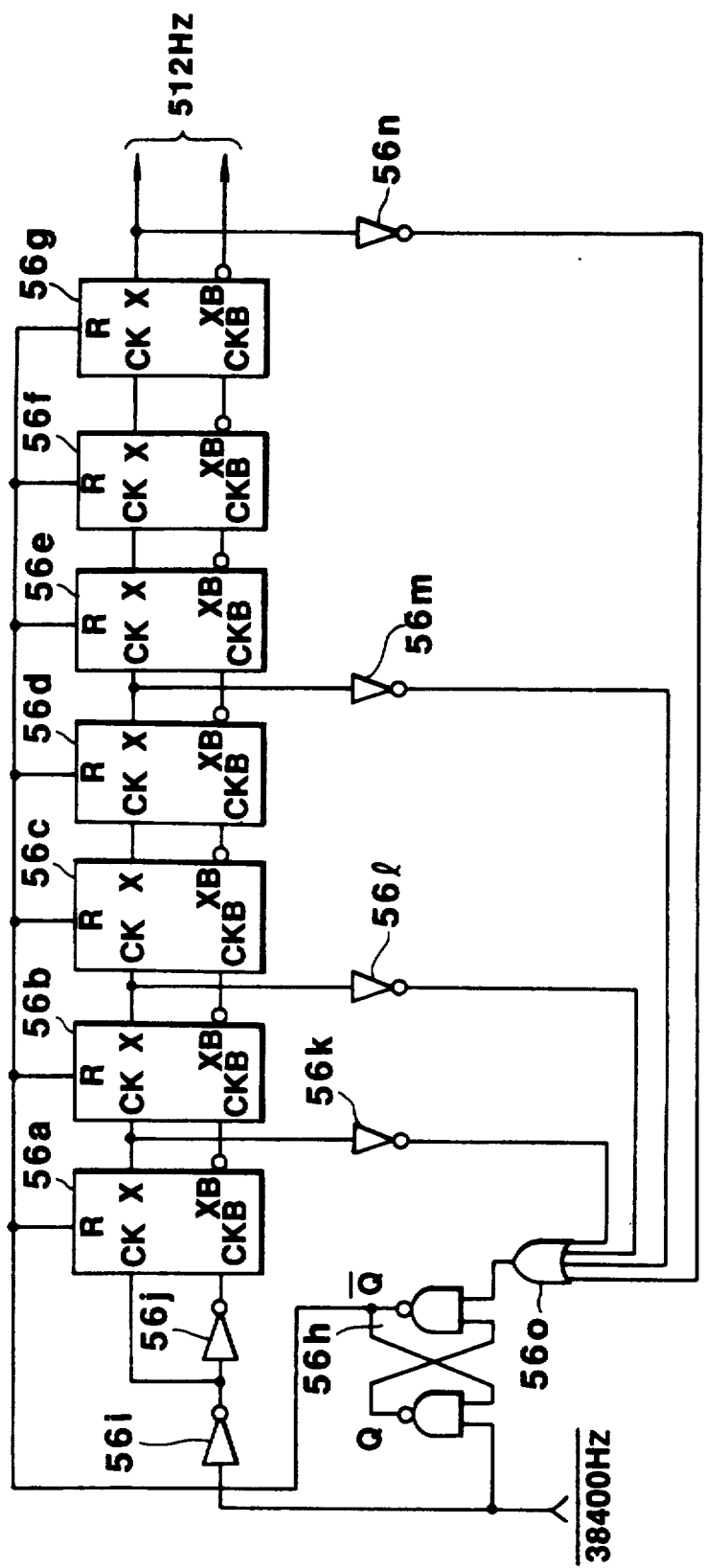
FIG. 8 is a view showing a detailed circuit construction of a second divider circuit 42b shown in FIG. 7.

FIG. 7 is a circuit diagram of the crystal oscillator 41 and the divider circuit 42. The oscillator 41 having a crystal oscillating element 41a generates a clock pulse signal of a frequency 38.4 KHz and supplies the clock pulse signal to a first divider circuit 42a and a second divider circuit 42b. The first divider circuit 42a comprises a three-stage flip-flop circuit of a cascade connection (not shown), and it divides the clock pulse signal of a frequency 38.4 KHz by a number 8 to obtain a clock pulse signal of a frequency 4800 Hz for data communication and send the obtained signal to the communication circuit section 48. The second divider circuit 42a, a detailed circuit of which is shown in FIG. 8 divides the delivered clock pulse signal of a frequency 38.4 KHz by a number 75 to obtain a clock pulse signal of a frequency 512 Hz and sends the obtained signal to the control section 43.

Under control of the control section 43, the communication circuit section 48 receives an input signal delivered through the connector portion 14, stores the received signal in a register (not shown) and further sends the received signal to the control section 43 in accordance with the clock pulse signal of 4800 Hz supplied from the first divider circuit 42a. Furthermore, the communication circuit section 48 produces an output signal in a particular format from data delivered from the control section 43 and sends the output signal to the connector portion 14. On the basis of the signal of 512 Hz delivered from the divider circuit 42, the control section 43 usually performs a time counting process for counting a present time, a process in response to key input operation and a display process, and in the communication operation the control section 43 processes data received at a frequency 4800 Hz in accordance with the clock pulse signal of 400 KHz delivered from the divider circuit 44.

Now, a detailed construction of the second divider circuit 42a which divides the clock pulse signal of 38.4 KHz to obtain the signal of 512 Hz will be described with reference to FIG. 8. As shown in FIG. 8, the second divider circuit 42a comprises binary counters (flip flop circuits) 56a through 56g, a flip flop circuit (hereafter, referred to as "F/F56h") consisting of two NAND circuits, inverters 56i through 56n and OR circuit 56o. The clock pulse signal of 38.4 KHz generated by the oscillator 41 is supplied to reset terminals of the inverter 56i and the F/F56h. An output terminal of the inverter 56i is connected to an input terminal of the inverter 56j and a clock terminal CK of the binary counter 56a. An output terminal of the inverter 56j is connected to a reverse input terminal CKB of the binary counter 56a. An output terminal X of the binary counter 56a is connected to a clock terminal CK of the binary counter 56b and a reverse output terminal XB of the binary counter 56a is connected to a reverse input terminal of the binary counter 56b, respectively. In the following stages, the binary counters 56b through 56g are successively connected in a similar fashion. The output terminals X of the binary counters 56a, 56b, 56d and 56g are input terminals of the inverters 56k through 56n, respectively and output terminals of the inverters 56k through 56n are connected to the input terminal of OR circuit 56o. An output terminal of OR circuit 56o is connected to a reset terminal of F/F56h and the inverse output terminal Q of F/F56h is connected to reset terminals R of the binary counters 56a through 56g. The binary counter 56g outputs a divided clock pulse signal of 512 Hz from its output terminal X.

Since the circuit construction of the divider circuits is designed as mentioned above, the first divider circuit 42a is capable of obtaining the clock pulse signal of 4800 Hz for data communication simply by subjecting the 38.4 KHz signal delivered from the oscillator 41 to an expression "$\frac{1}{8}(=(\frac{1}{2})^3))$" and the first divider circuit 42a supplies the signal of 4800 Hz to the communication circuit section 48. The second divider circuit 42b is capable of obtaining the clock pulse signal of 512 Hz for time counting and/or for processing at a low speed by subjecting the 38.4 KHz signal to an expression "1/75".

More specifically, a group of binary counters 56a to 56g in the divider circuit 42b function as a divided-by-75 counter. The binary counter 56g counts the most significant digit and when the divided-by-75 counter counts "75 (=1001011)", the binary counters 56a, 56b, 56d and 56g output "1" at respective output terminals X. That is, all of outputs of the inverters 56k through 56n become "0", the output of the OR circuit 56o become "0" and the output at the inverse Q terminal of F/F56h becomes "1", and thereby all of the binary counters 56a through 56g are reset.

Figure 9:
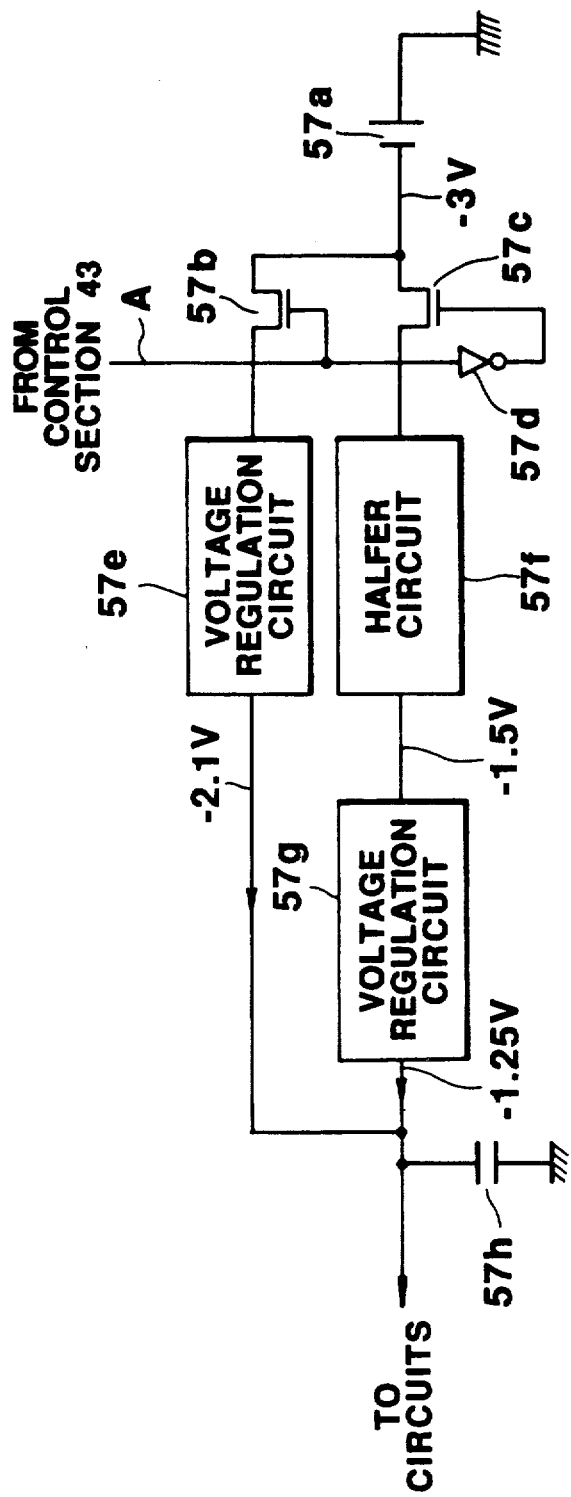
FIG. 9 is a view showing a detailed circuit construction of a power source circuit 55 shown in FIG. 5.

A detailed circuit construction of power supply circuit 55 of FIG. 5 is shown in FIG. 9. A battery 57a is a lithium battery with electromotive force of 3 volts. The output voltage −3 volts of the lithium battery is supplied though switching transistors 57b, 57c to a first voltage regulation circuit 57a and a halfer circuit 57f. When "1" is the control signal A delivered from the control section 43 which is supplied to the gate electrode of the transistor 57b, the transistor 57b is brought ON. When "1" is the inverse control signal A or output of the inverter 57d which is supplied to the gate electrode of the transistor 57c, the transistor 57c is brought ON.

The halfer circuit 57f drops the power voltage, −3 volts, supplied through the transistor 57b to its half, −1.5 volts, and the first voltage regulation circuit 57e regulates the power voltage, −3 volts, supplied through the transistor 57c to −2.1 volts. The power voltage, −1.5 volts, of the halfer circuit 57f is supplied to a second voltage regulation circuit 57g, which regulates the supplied voltage to −1.25 volts. The output terminals of the first and second voltage regulation circuit 57e, 57g are connected to each other and a smoothing capacitor (or a compensating capacitor) 57h is connected between the output terminals and the earth. The voltage at the junction point of the capacitor 57h and the output terminals of the regulation circuits 57a, 57g is supplied to whole circuits of the wrist watch. More specifically, when the control signal A is absent or the control signal A is "0", the power voltage −3 volts is regulated to −1.25 volts by the transistor 57c, the halfer circuit 57f and the second voltage regulation circuit 57g. When the control signal A goes to "1", the transistor 57b is made ON and thereby the power voltage −2.1 volts is output.

Figure 10:
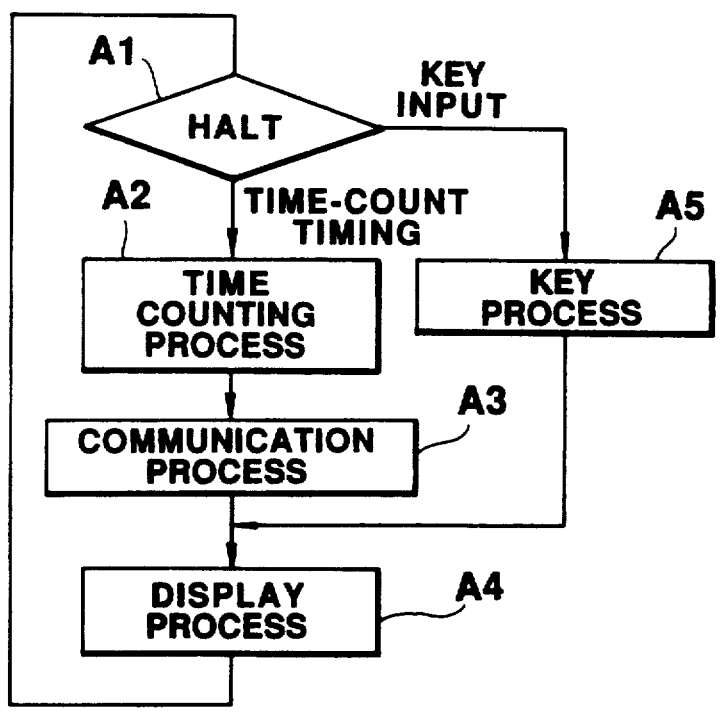
FIG. 10 is a flow chart showing operation of the circuit shown in FIG. 5.

Now, operation of the above mentioned embodiment will be described. FIG. 10 is a flow chart showing the whole operation performed by the embodiment under control of the control section 43.

At step A1, the embodiment is in HALT state where timing of time counting of every 1/16 second or key input is detected. When the timing of the time counting of 1/16 second is reach, the operation goes to a time counting process at A2, where time data of the time counting register 49b is renewed. Thereafter, the operation goes to a communication process at step A3, where it is judged if at least one of the contents of the flag registers L0, L1 has been set to "1". When it is judged that the flag L1 has been set to "1", a receiving process is performed, while a transmitting process is performed when the flag L1 has been set to "1". The receiving and transmitting process will be described in detail later.

After completion of the communication process at step A3, the operation advances to a display process at step A4 and then returns to step A1. When any key input is detected in the HALT state at step A1, an appropriate key process corresponding to the key input is performed at step A5 and then the operation goes to step A4.

The above processes at steps A1 through A5 are performed under control of the clock pulse signal of 512 KHz, which is obtained in the divider circuit 42 by dividing the clock pulse signal of the crystal oscillator 41. But, as will be described later, the communication process at step A3 is performed at a high speed under control of the signal of 400 KHz delivered from the divider circuit 44.

A data receiving mode for receiving data or a data transmitting mode for transmitting data is selected by operation of the switch S2 or S3, respectively (the flag L0 or L1 is set to "1" at step A5). Operation of the switch S4 sets "1" to the flag F at step A5, and a state of these flags is detected and the receiving process or the transmitting process is performed.

Figure 11:
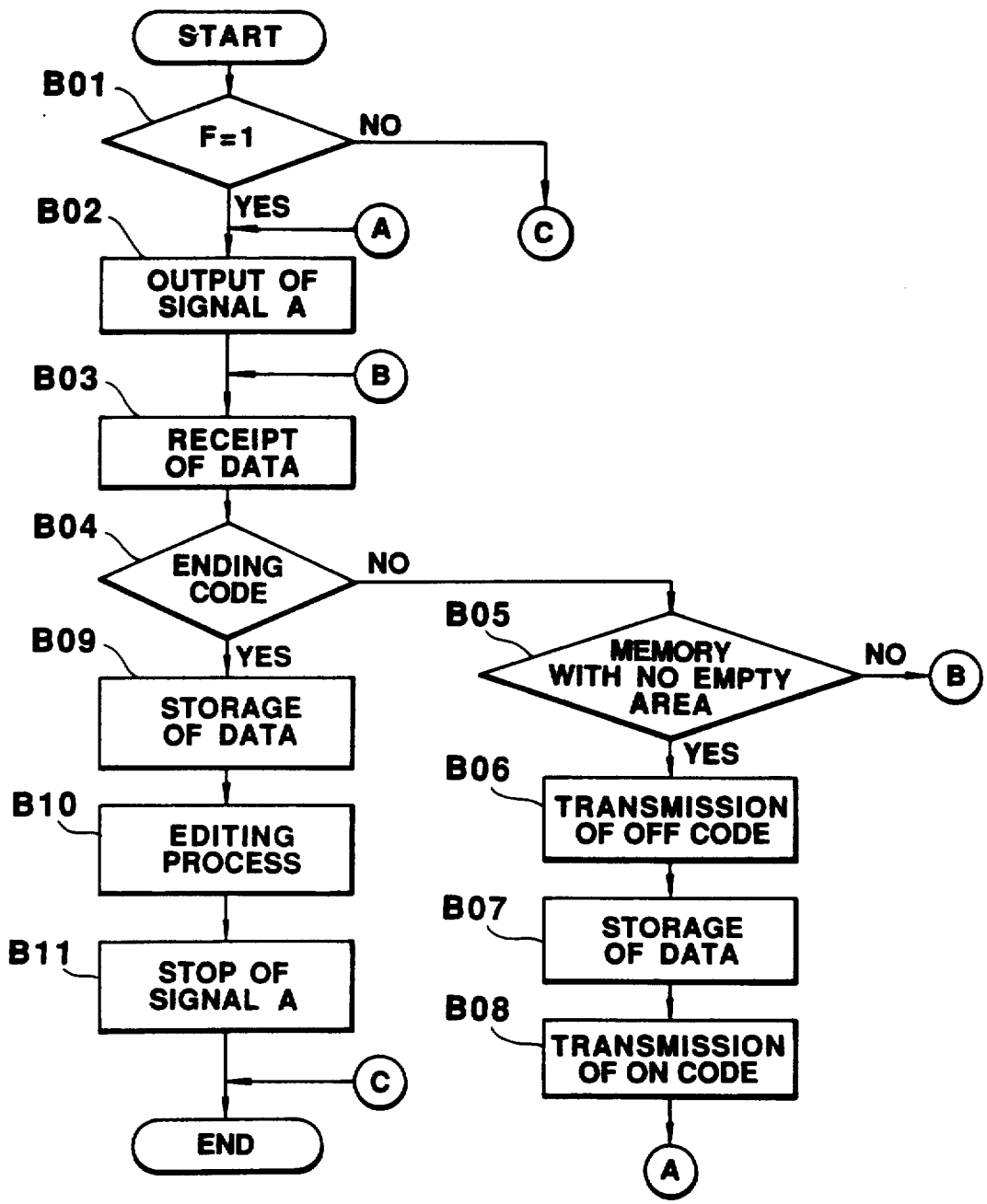
FIG. 11 is a flow chart showing a detailed communication shown in FIG. 10.

FIG. 11 is a flow chart of the communication process at step A3 in the receiving mode or in case that the flag L0 is set to "1".

At step B01, it is judged if the flag F has been set to "1". When it is judged that the flag F has been set to "0", the operation is terminated. When the flag F has been set to "1", the operation goes to step B02, where the output signal A of the control section 43 is brought high. Output of the signal A of the control section 43 causes the CR oscillator 51 to start oscillation. The oscillation signal of the CR oscillator 51 is supplied to the divider circuit 44. In addition, the control signal A drives the divider circuit 44 to divide the oscillation signal of 800 KHz delivered from the CR oscillator 51 to obtain the clock pulse signal of 400 KHz, which is supplied to the control section 43. Receiving the clock pulse signal of 400 KHz from the divider circuit 44, the control section 43 performs each process at a high speed (at a higher frequency) under control of the clock pulse signal of 400 KHz from the divider circuit 44 in place of the clock pulse signal from the divider circuit 42. At the same time, the control signal A is supplied to the power supply circuit 55, switching its output voltage from −1.25 volts to −2.1 volts. At step B03, the control section 43 stores data in synchronizm with the signal 4800 Hz, delivered from the external appliance 54 in the communication data register 49c of the subsidiary RAM 49.

When the delivered data includes code data representing end of the data communication, this communication data is detected at step B04. When the data include no code data, then the operation goes to step B05, where it is judged if the register 49c is full of delivered data. When it is judged that the register 49c is not full of data, the processes at steps B03, B04 and B05 are performed repeatedly and thereby delivered data are successively stored in the register 49c.

When the register 49c has become full of data, this state is detected at step B05 and then the operation advances to step B06. At step B06, the control section 43 sends OFF code to the external appliance 54 to cause it to stop transmitting data and transfers data stored in the register 49c to the main RAM 47.

When the transference of data from the register 49c to the main RAM 47 is completed, the operation goes to step B08, where the control section 43 sends ON code to the external appliance 54 to cause it to start transferring data to the control section 43. Then, the operation returns to step B02.

As described above, when the control section 43 received data from the external appliance 54 and has finally received a finishing code (ending code) which represents that all the data to be transferred have been transferred, then the control section 43 goes from step B04 to step B09, where data is stored in the same way as at step B07.

At step B11, the control section 43 performs an edition process. More specifically, if transferred data include a number of names and phone numbers, names and phone numbers previously stored in the main RAM 47 and the currently transferred names and phone numbers are rearranged in a predetermined order, for instance, in an alphabetical order. Then, the control section 43 stores these names and phone numbers in the main RAM 47 again and stops sending the signal A at step B11, completing the receiving process.

The transmitting process is performed in the similar manner to the receiving process. The control section 43 sends the control signal A to the CR Oscillator 51 and the power source circuit 55. Receiving the signal A, the CR oscillator 51 sends the clock pulse signal of 400 KHz through the divider circuit 44 to the control section 43. The power supply circuit 55 switches the voltage to −2.1 volts. The control section 43 transmits the data to be transmitted, from the main RAM 47 to the register 49c. The control section 43 transmits the data stored in the register 49c to an external appliance 54. When the data stored in the register 49c have been transmitted, then the control section 43 transfers another data to the register 49c. Thereafter, data are transmitted to the external appliance 54 in the same way. When all the data to be transmitted have been transmitted, the control section 43 stops sending the control signal A.

In the embodiment, since a frequency 38.4 KHz is selected as that of the signal of the oscillator 41, a clock pulse signal for communication can be easily generated and in addition, since the above frequency 38.4 KHz is close to a frequency of oscillation of crystal, 32.768 KHz, that is used generally for an electronic time counting, a time counting operation is performed precisely and power consumption is a little. Further, the oscillator is allowed to be easily manufactured.

Further, not only as a high frequency signal of the oscillator is used for accessing data in a communication operation, data communication is allowed to be performed in a short time, but also as the voltage of the power supply circuit is switched to a high voltage in the communication operation, defective operations are prevented. Since RAM of a small capacity is used for receiving and transferring data and data are written into RAM of a large capacity after communication in the first embodiment, there is no need to access data in synchronism with a writing speed of data into RAM of a large capacity, resulting in decreased power consumption.

Second Embodiment

FIGS. 12 through 21 are views showing the second embodiment of the present invention.

Figure 12:
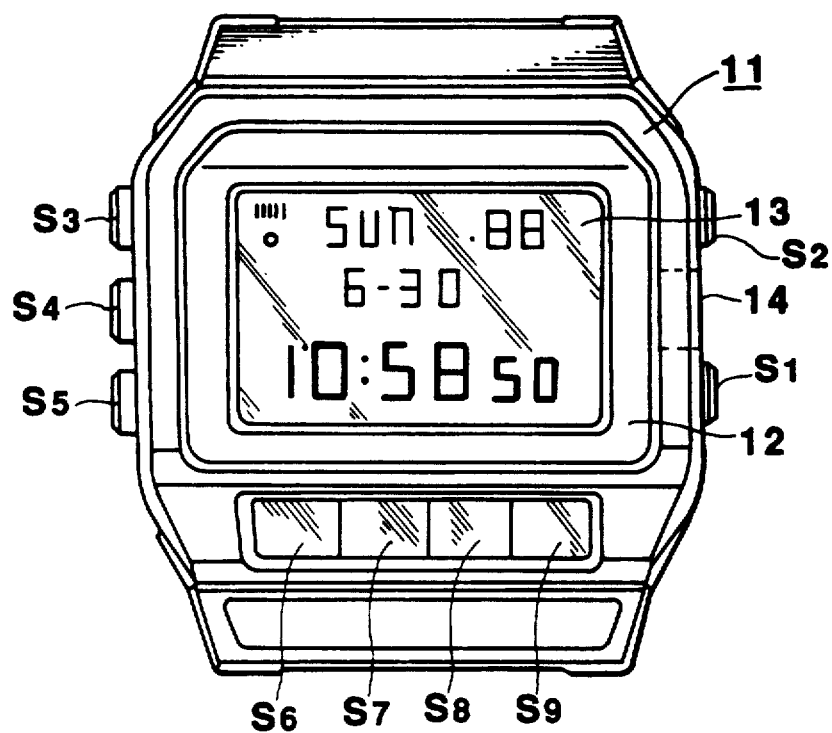
Figure 13:
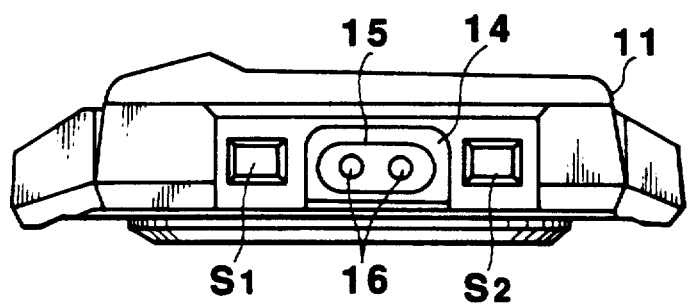

FIGS. 12 and 13 are views showing an external appearance of the second embodiment, which is similar to that of the first embodiment of FIG. 1 except that the second embodiment is provided with nine switches S1 through S9.

Figure 14:
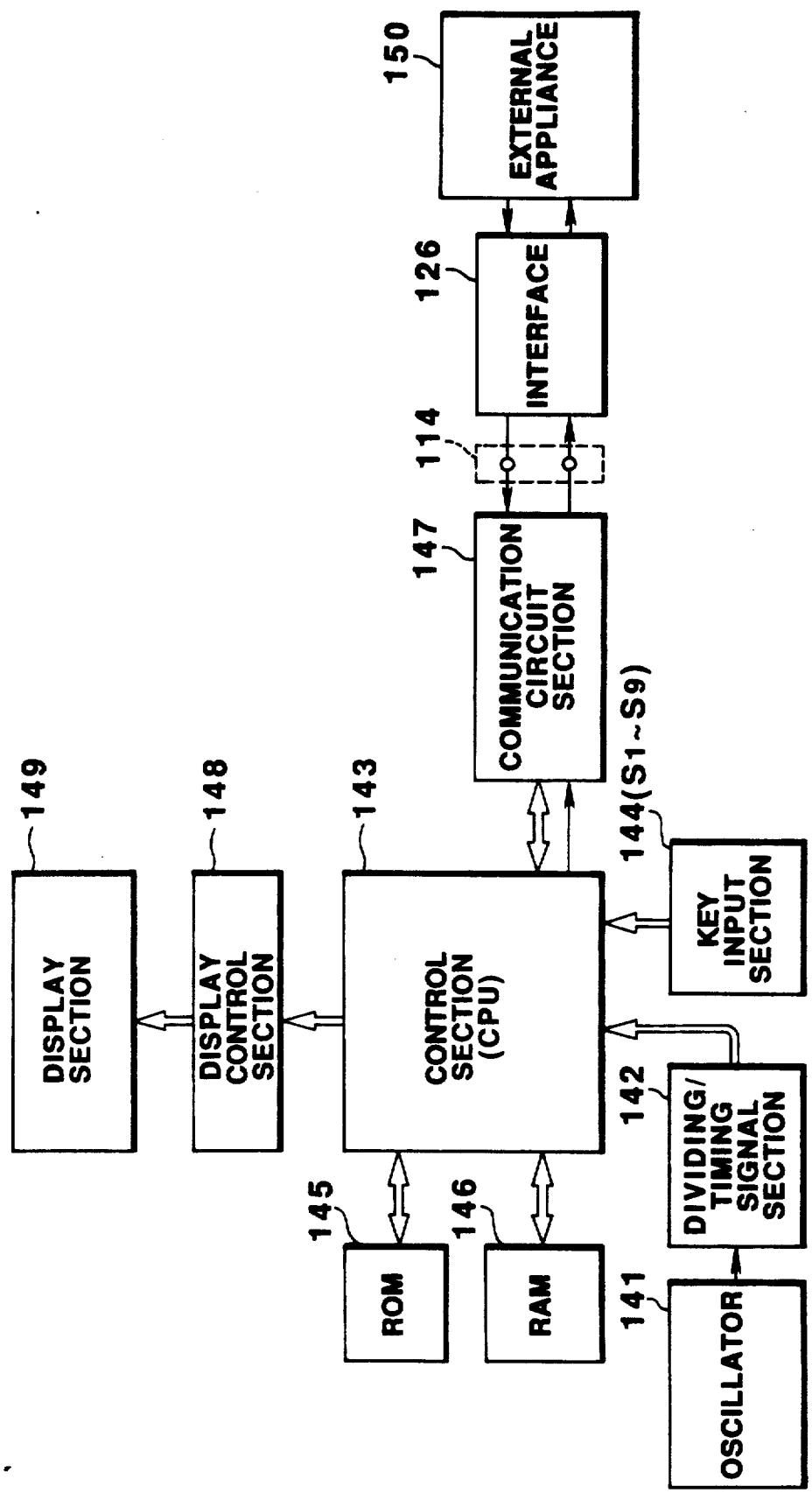

FIG. 14 is a circuit diagram of an electronic wrist watch according to the second embodiment. In FIG. 14, a numeral 141 denotes an oscillator that generates a pulse signal of a reference frequency. This pulse signal is used as a reference for various operations of the embodiment and for time counting. The pulse signal of a reference frequency generated by the oscillator 141 is divided by a dividing/timing signal section 142 into a timing signal which is sent to a control section 143 including CPU. The oscillator 141 and the dividing-/timing signal section 143 comprise the crystal oscillator 41, the divider circuit 42, crystal oscillator 51 and divider circuit 44 of FIG. 5.

The control section 143 controls operation of each circuit pertinent to a key input signal from a key input section 144 consisting of push button switches S1 through S9, in accordance with the timing signal from the dividing/timing signal 144. The control section further reads a micro-program for controlling operations of circuits by addressing ROM 145, which stores the micro-program, and reads and/or writes data by addressing RAM 146 that stores various data. The control section 143 transfers and receives data from a communication circuit 147, while supplies data to a display control section 148. The display control section 148 decodes data delivered from the control section 143 to obtain a driving signal. A display section 149 comprising a liquid crystal display device 113 is driven with the driving signal to display time data, communication data.

The communication circuit section 147 is connected to an interface 126 through a connecting portion 114 and it exchanges data with an external appliance 150 such as the electronic note book 21 shown in FIG. 3. The external appliance 150 is of the same circuit construction (not shown) as that of the appliance 54 comprising CPU, ROM, RAM and so on. Data delivered from the external appliance 150 through the interface 126 and the connecting portion 114 is received by the communication circuit 147 and is temporarily stored in a buffer memory (not shown) provided in the communication circuit 147 and then the data is stored in RAM 146 by operation of the control section 143.

Figure 15:
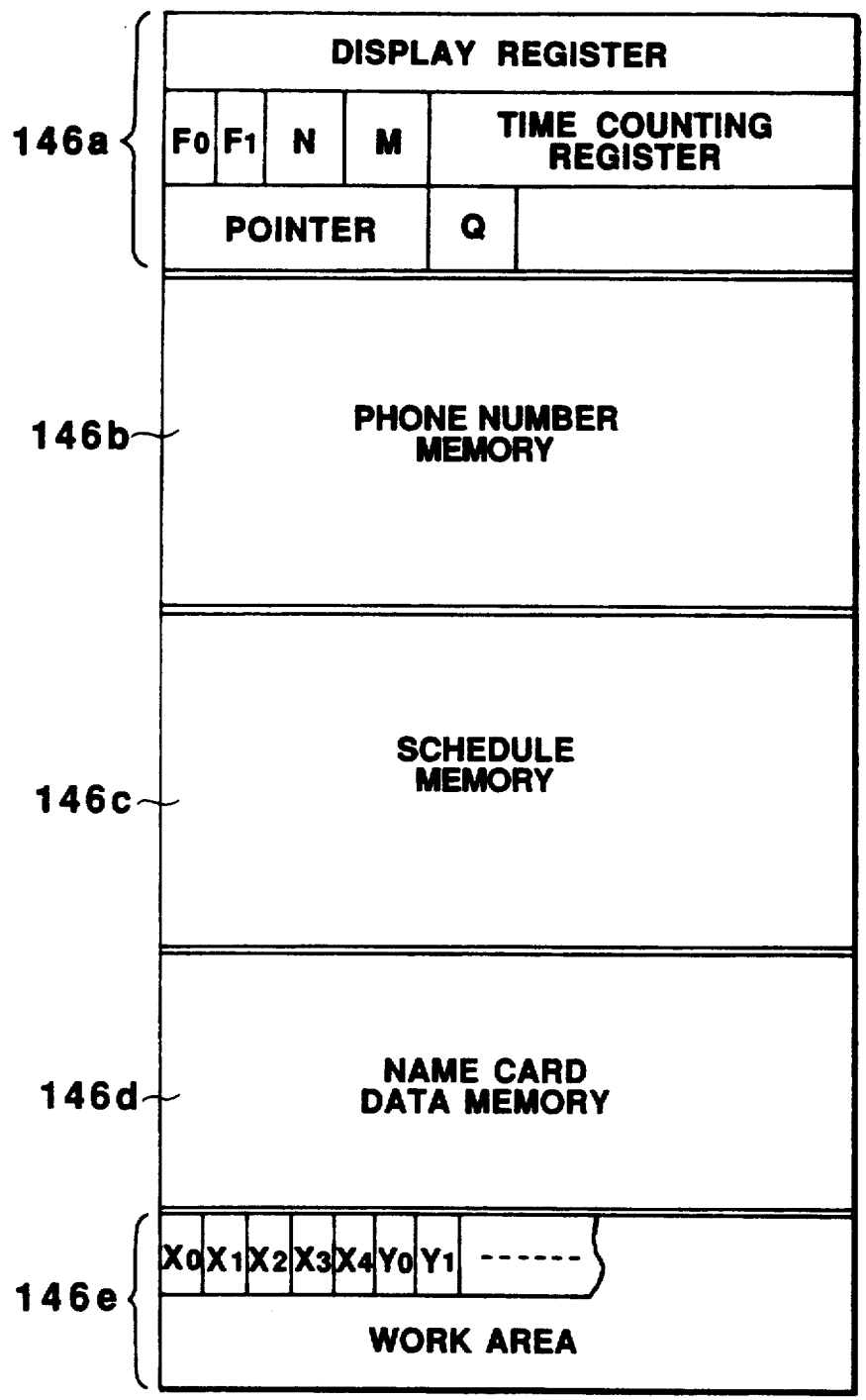

FIG. 15 is a view showing a detailed construction of RAM 146. RAM 146 comprises a register area 146a, phone number memory 146b, schedule memory 146c, name card data memory 146d and work area 146e.

The register area 146a consists of a display register, F0 register, F1 register, N register, M register (mode register), a time counting register, a pointer and Q register.

The display register serves to hold display data and F0 register is a flag register which is set to "1" in the receiving mode while F1 register is a flag register which is set to "1" in the transmitting mode.

N register is provided for judging volume of data to be transmitted in the transmitting mode. N register is set to "0" when all the data stored in phone number memory 146b, schedule memory 146c and name card data memory 146d are transmitted and is set to "1" when all the data stored in one of phone number memory 146b, schedule memory 146c and name card data memory 146d are transmitted, and further is set to "2" when one of display data held in the display register is transmitted.

The mode register M is a divided-by-four counter, the counting value, i.e., mode data of which counter takes a value "0" when time data is displayed, takes a value "1" when phone number data is displayed, takes a value "2" when schedule data is displayed and further takes a value "3" when name card data is displayed. Every renewal of data, the mode register M circularly takes one of values "0" to "3".

The time counting register functions to renew and store time data and the pointer designates and displays one of data stored in phone number memory 146b, schedule memory 146c and name card data memory 146d.

Q register serves to successively renew and store a data item of received data stored in the memories 146b to 146d.

The phone number memory 146b stores a plurality of phone number data in alphabetical order of name, which phone number data each includes data items such as a name, its pronunciation, phone number, address and memorandum.

The schedule memory 146c stores in order of date a plurality of schedule data each including date and contents of schedule.

The name card data memory 146d stores a plurality of name card data each including company name, phone number and address in alphabetical order of company name.

The work area 146e is for storing data items stored in the phone number memory 146b, schedule memory 146c and name card data memory 146d. The work area 146e comprises X0 register, to which a flag "1" is set when name data of phone number data is stored, X1 register, to which a flag "1" is set, when pronunciation data of phone number data is stored, X2 register, to which a flag "1" is set, when phone number data of phone number data is stored, X3 register, to which a flag "1" is set, when address data of phone number data is stored, X4 register, to which a flag "1" is set, when memorandum data of phone number data is stored, Y0 register, to which a flag "1" is set, when date data of schedule data is stored and Y1 register, to which a flag "1" is set, when schedule content data of schedule data is stored.

Boundaries among phone number memory 146b, schedule memory 146c and name card data memory 146d are variable and the boundaries are decided and set within a certain area on the basis of the data volume stored in phone number memory 146b, schedule memory 146c and name card data memory 146d.

Referring to FIG. 15 will be described the fundamental format of data which are exchanged between the external appliance 150 and the communication circuit section 147 of FIG. 14 and are stored in RAM 146.

Figure 16:
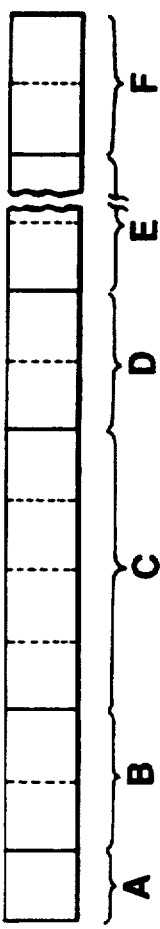

In the second embodiment, data receiving and/or transmitting operation is performed in accordance with the RS-232C Interface Standard. As shown in FIG. 16, each data consists of one data block including start code A of one byte, byte-number data B of two bytes, address C of four bytes, mode data code D of two bytes, data E of n-bytes and check sum F of two bytes for checking for error. For transmitting data, a data block of mode data is arranged at its leading portion, true data follow the mode data for an arbitrary number of data blocks and a data block of ending data is arranged at the tail.

Figure 17A:
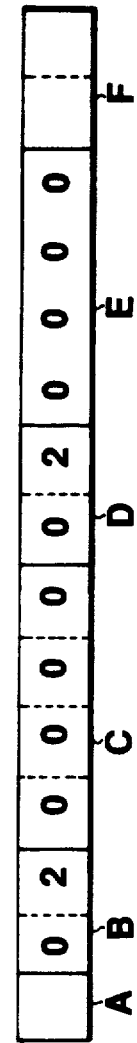
FIG. 17A is a view showing a data format of mode data.

Mode data shown in FIG. 17A is the leading data block indicating to which mode the following data are assigned. The byte-number data B is "02", the address C is "0000", the mode data code D is "02" indicating that data are mode data and the data E are different depending on amount of data to be transmitted or depending on the mode.

Figure 17B:
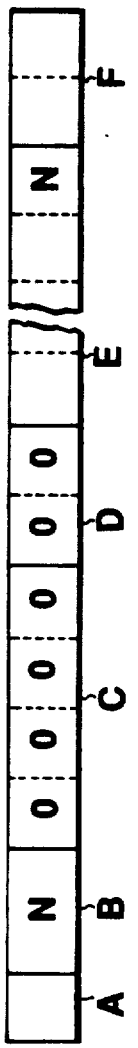
FIG. 17B is a view showing a data format of true data.

In the data block of true data shown in FIG. 17B, the byte-number data B is N, number of bytes of data E, and the leading byte of the address C indicates data item of the following data in that mode. More specifically, if the true data is data of the phone number mode, data item of the following data is one of name data, pronunciation data, address data, phone number data and memorandum data. The following three bytes of the address C indicate true address. The mode data code D following the address C is "00" indicating a true code and data E consists data of N bytes.

Figure 17C:
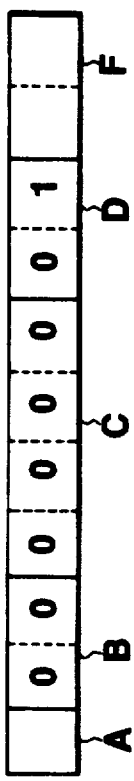
FIG. 17C is a view showing a data format of ending data.

The data block of ending data shown in FIG. 17C functions to indicate ending of data transmission and also to instruct registration of data. The byte-number data B is "00", the address C is "0000" and the mode data code D is "01" indicating that data are ending data and then the check sum F directly follows the mode data code D (with data E omitted).

Now, operation of the second embodiment will be described.

Figure 18:
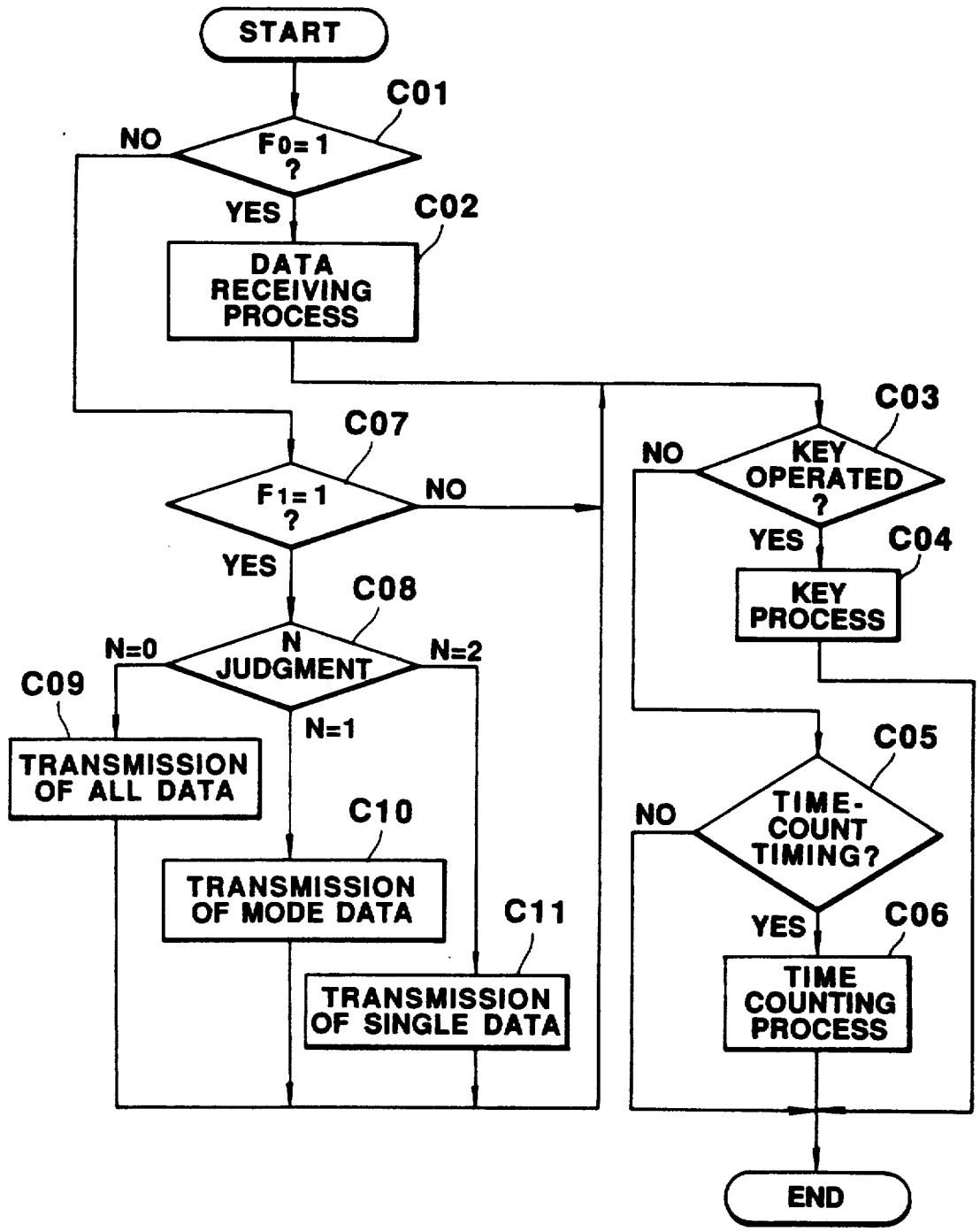

FIG. 18 is a flow chart of the whole processes performed in the embodiment. These processes are performed every particular timing. It is judged at step C01 if a flag "1" representative of the receiving mode has been set to F0 register of the register area 146a in RAM 146. When it is judged that the flag "1" has been set to F0 register, the operation advances to the receiving process at step C02.

Figure 19:
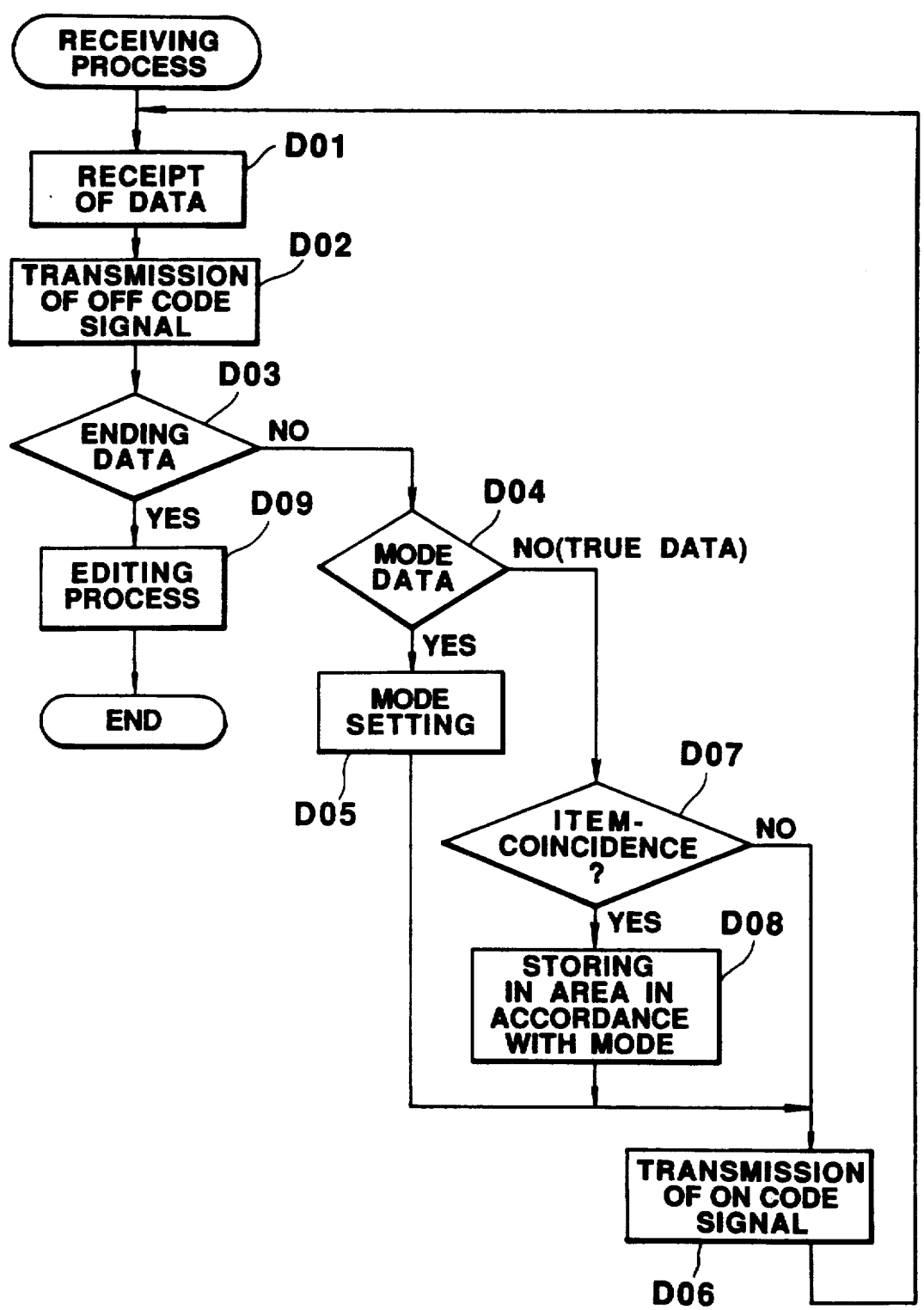

Details of the receiving process is shown in FIG. 19. In the receiving process, the control section 143 starts operation for receiving data in synchronism with ON code signal transmitted from the external appliance 150. At step D01, the control section 143 receives and temporarily stores one data block in the work area 146e of RAM 146 and then sends OFF code signal representative of receipt of data to the external appliance 150 at step D02. Receiving OFF code signal, the external appliance 150 stops transmitting data until it receives ON code signal. At step D03, it is judged if a data block held in the work area 146e is the final data in a series of transmitted data or if the mode data code D in the data block is "01". When the result of the judgement is "NO", the operation goes to step D04, it is judged by reading the mode data code D, if the data block is mode data which is arranged at the leading position of a series of transmitted data. When it is judged that the mode data code D is "02" and the data block is mode data, the operation advances to step D05, where data E in the block data is read out and set to the mode register M in the register area 146a. If the read out data E is representative of the phone number mode, "1" is set to the mode register M. If the data E is representative of the schedule mode, "2" is set to the mode register M while if the data E indicates the name card data, then "3" is set to the mode register M. Thereafter, the control section 143 sends ON code signal to the external appliance 150 to cause it to transmit the following data block at step D06. Then, operation returns to step D01, again.

At step D01, the control section 143 receives and stores true data for one data block in the work area 146e and then the operation advances to step D04 through steps D02, D03. When it is judged at step D04 that the data block is not mode data, i.e, that the data block is true data, then the operation goes to step D07. At step D07, it is judged if a flag "1" has been set to one of X0 register through Y1 register in the work area 146e, which one is designated with the content of Q register in the register area 146a or it is judged if the data item of received data held in the work area 146e coincides with a data item which is previously set as being required by key operation.

When no coincidence between the two data items has been found, the control section 143 does not store the data held in the work area 146e in any of phone number memory 146b, schedule memory 146c and name card data memory 146d, since the data in the work area 146e does not corresponds to the required data item. Then, at step D06, the control section 143 sends ON code signal to the external appliance 150 to cause it to transmit the next data block, and returns to step D01.

Receiving the next data block at step D01, the control section 143 holds the received data block in the work area 146e and goes through steps D02, D03 to step D04, where it judges if the data block is true data. When it is judged that the data block is true data, the operation goes to step D07. When it is judged at step D07 that a flag "1" is set to a register in the work area 146e that is designated with the content of Q register and further it is judged that a data item of the data held in the work area 146e coincides with the required data item, the control section 143 stores, at step D08, the data held in the work area 146e in an empty area in accordance with the mode corresponding to the content of the mode register M since the data held in the work area 146e corresponds to the required data item. At step D06, the control section 143 sends ON code signal to the external appliance 150 to cause it to transmit the next data block, and returns to step D01, again.

In the following operation, the control section 143 successively receives and holds data blocks of true data in the work area 146e and then repeats the above processes. Further, the control section 143 successively stores only data which correspond to the required data items in any one of pertinent areas in the memories 146b to 146d in accordance with the data mode.

The control section 143 finishes receiving data blocks of true data and then receives an ending data. The control section 143 receives the data blocks of true data at step D01 and sends OFF code signal at step D02. When it is judged at the following step D03 that the received data block is the ending data, the operation goes to step D09, where an editing process is performed with respect to the data stored in the memory in accordance with the content of the mode register M. In the editing process, if the mode register M is set to "1", i.e., the received data is phone number data, the phone number data stored in the phone number memory 146b are re-arranged in alphabetical order of name data involved in the phone number data. If the mode register M is set to "2", i.e., the received data is schedule data, schedule data stored in the schedule data memory 146c are re-arranged in order of date data involved in the schedule data. If the mode register M is set to "3", i.e., the received data is name card data, name card data stored in the name card data memory 146d are re-arranged in order of trade name data involved in the name card data. In this manner, even though an arrangement of data stored in the memory is disturbed when new data is received, all the data including the new data are re-arranged. At completion of the editing process, the receiving process of FIG. 19 is finished.

After completion of the receiving process, the operation goes from step C02 to step C03 of FIG. 18, where it is judged if the key input section 144 of switches S1 through S9 has been operated or if key input has been entered by operation of the key input section 144. When it is judged that the key input has been entered, the operation goes to step C04, where a pertinent key process is performed in accordance with the key input.

Figure 20:
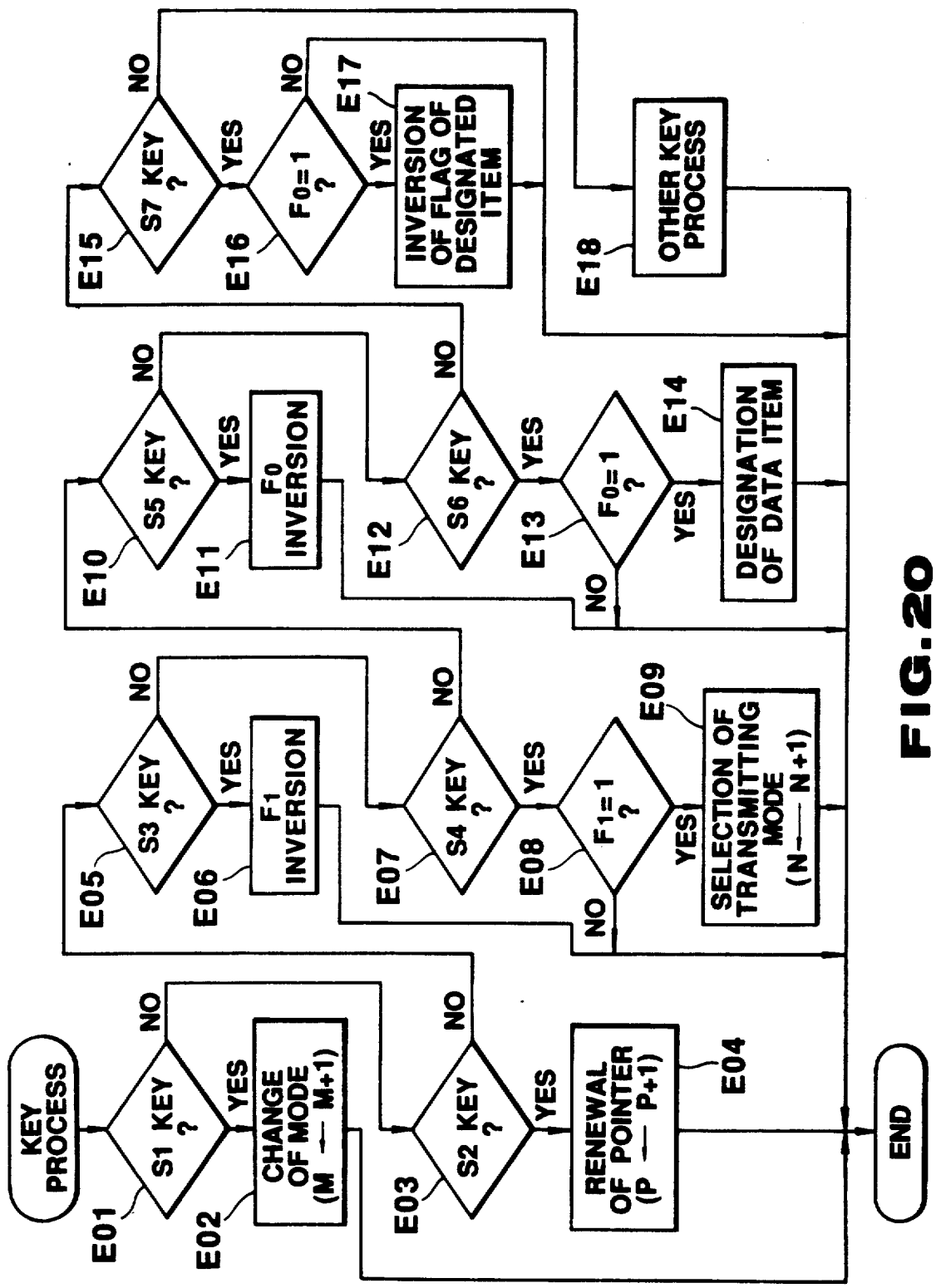

FIG. 20 is a view showing details of the key process of FIG. 18. At step E01, it is judged whether an operated key is the push button switch S1. When it is judged that the operated key is the push button switch S1, operation advances to step E02, where the control section 143 advances the content of the mode register M by "+1" and at the same time it changes the display mode on the display section 149 on the basis of the advanced content of the mode register M, that is, from the time data display mode to the phone number data display mode, or from the phone number data mode to the schedule data display mode. Now, the key process is finished.

When it is judged at step E01 that the operated key is not the push button switch S1, the operation goes to step E03, where it is judged whether the operated key is the push button switch S2. When it is judged that the operated key is the push button switch S2, the operation goes to step E04, where the control section 143 advances the content of the pointer of the register area 146a by "+1". Now this process is finished.

When it is judged at step E03 that the operated key is not the push button switch S2, the operation goes to step E05, where it is judged whether the operated key is the push button switch S3. When it is judged that the operated key is the push button switch S3, the operation goes to step E06, where the control section 143 inverts the content of F1 register of the register area 146a, from "0" to "1" or from "1" to "0" and finishes this process.

When it is judged at step E05 that the operated key is not the push button switch S3, the operation goes to step E07, where it is judged whether the operated key is the push button switch S4.

When it is judged that the push button switch S4 has been operated, the operation goes to step E08, where it is judged if F1 register has been set to "1" for setting the data transmitting mode. When F1 register has not been set to "1", operation of the push button switch S4 is ignored and the key process is finished. When F1 register has been set to "1", the operation goes to step E09, where the content of N register in the register area 146a for defining an amount of data to be transmitted is advanced by "+1". Then the key process is finished.

When it is judged at step E07 that a key other than the push button switch S4 has been operated, the operation goes to step E10, where it is judged if the push button switch S5 has been operated. When it is judged that the push button switch S5 has been operated, the operation goes to step E11, where the content of F0 register in the register area 146a is inverted from "0" to "1" of from "1" to "0". Then the key process is finished.

When it is judged at step E10 that a key other than the push button switch S5 has not been operated, the operation goes to step E12, where it is judged if the push button switch S6 has been operated. When it is judged that the push button switch S6 has been operated, the operation goes to step E13, where it is judged if a flag "1" has been set to F0 register in the register area 146a or if the receiving mode has been set. When it is judged that a flag "1" has not been set to F0 register, the key process is finished. When it is judged that a flag "1" has been set to F0 register, the flag "1" of F0 register means that the push button switch S6 has been operated in the receiving mode to selectively renew a data item of received data, which data item is required to be stored. At step E14, a register designating position is renewed in the register area 146a corresponding the mode indicated by the mode register M. More specifically, for example, when the mode register M is set to "1", indicating that the phone number mode has been set, a register designating position of one of the registers X0 to X4 in the work area 146e is renewed and the key process is finished.

When it is judged at step E12 that a key other than the push button switch S6 has been operated, it is judged at step E15 if the push button switch S7 has been operated. When it is judged that the push button switch S7 has been operated, the operation goes to step E16, where it is judged if a flag "1" has been set to F0 register in the register area 146a or if the receiving mode has been set. When a flag "1" has not been set to F0 register, operation of the push button switch S7 is ignored and the key process is finished. When a flag "1" has been set to F0 register, the flag "1" set in F0 register means that the push button switch S7 has been operated in the receiving mode to set and select a particular data item which is required to be stored. At step E17, the content of a designated register in the register area 146a corresponding to the mode indicated by the mode register M is inverted from "0" to "1" or from "1" to "0". More specifically, for example, when the mode register M is set to "1", designating the phone number mode and X2 register of "0" is designated as a pertinent register in RAM 146, the content of X2 register is inverted from "0" to "1". Thereafter, the key process is finished.

When it is judged at step E15 that a key other than the push button switch S7 has been operated, it is judged that one of the push button switches S8 and S9 has been operated. At the following step E18, a pertinent process designated by of the operated push button switch is performed and the key process is finished.

FIG. 21 is a view showing an indication of a selection process of data item in the phone number mode. Data items such as "name", "pronunciation", "phone number", "address" and "memorandum" are indicated, and a number "1", which designates a data item to be stored is assigned only to data items to which a flag "1" is set in accordance with the contents of X0 register to X4 register while a number "0" indicating a data item which is not required to be stored is assigned to remaining data items. When the above process is completed, the key process of FIG. 20 is finished.

After completion of the key process of FIG. 20 or when it is judged at step C03 of FIG. 18 that none of push button switches S1 through S9 is operated, the operation goes to step C05, where the control section 143 judges whether the timing signal has been supplied thereto from the divider/timing signal section 142 to see if it is a time for time counting. When it is not a time for time counting, the process of FIG. 18 is finished. In the meantime, when it is judged that it is a time for time counting, the process goes to step C06, where the time counting process is performed, i.e., time data in the time counting register of the register area 146a is renewed to obtain a present time data, and at the same time, if the time display mode has been set, display data or time data stored in the display register is also renewed. Then the process of FIG. 18 is finished.

Now, the data transmitting process will be described.

In FIG. 18, when it is judged at step C01 that F0 register of the register area 146a has been set to "0" and the receiving mode has not been set, the operation goes to step C07, where it is judged if a flag "1" has been set to F1 register or if the transmitting mode has been set. When the transmitting mode has not been set, operation for transmitting data is not performed and the operation goes directly to step C03, where the control section 143 performs the key process and the time counting process, if necessary. When it is judged at step C07 that the transmitting mode has been set and the transmitting mode has been set, the operation goes to step C08, where the content of N register in the register area 146a is discriminated. The content of N register is used for judging volume of data to be transmitted. When it is judged that the content of N register is "0", the operation goes to step C09, where all the data stored in the phone number memory 146b, schedule memory 146c, name card data memory 146d are read out and are combined to form true data as shown in FIG. 17B. At the leading portion to the true data, there is disposed mode data of FIG. 17A and at the tail of the true data there is disposed ending data shown in FIG. 17C. True data with the mode data and the ending data added at its leading and its tail portion respectively is transmitted from the communication circuit section 147 to the external appliance 150.

When it is judged at step C08 that the content of N register is "1", the operation goes to step C10, where all the data are read out from the memory selected from the phone number memory 146b, schedule memory 146c and name card data memory 146d by the content of the mode register M, and the read out data are successively delivered to the communication circuit section 147. The communication circuit section 147 combines the delivered data into a data block shown in FIGS. 17A to 17C and transmits it to the external appliance 150.

When it is judged at step C08 that the content of N register is "2", the operation goes to step C11, where one set of data is read out which is stored at a position designated by an pointer of the pointer section P in the memory which is selected from the phone number memory 146b, schedule memory 145c and name card memory 146d by the content of the mode register M and the read out data is delivered to the communication circuit section 147, and thereby the data transmitting process is performed.

After performance of one of processes of steps C09 through C11, the operation goes to step C03.

In the second embodiment, the control section selects and stores a necessary data item in a unit of data which will be transmitted. Receiving data, the control section judges if a data item of the transmitted data coincides with the previously stored data item and it stores only the necessary data in the data memory. Since the control section judges if the transmitted data is necessary or not and it selects and stores only necessary data in the data memory, volume of data to be stored is decreased and as a result the data memory with a limited memory capacity is allowed to store sufficient units of data.

Figure 22:
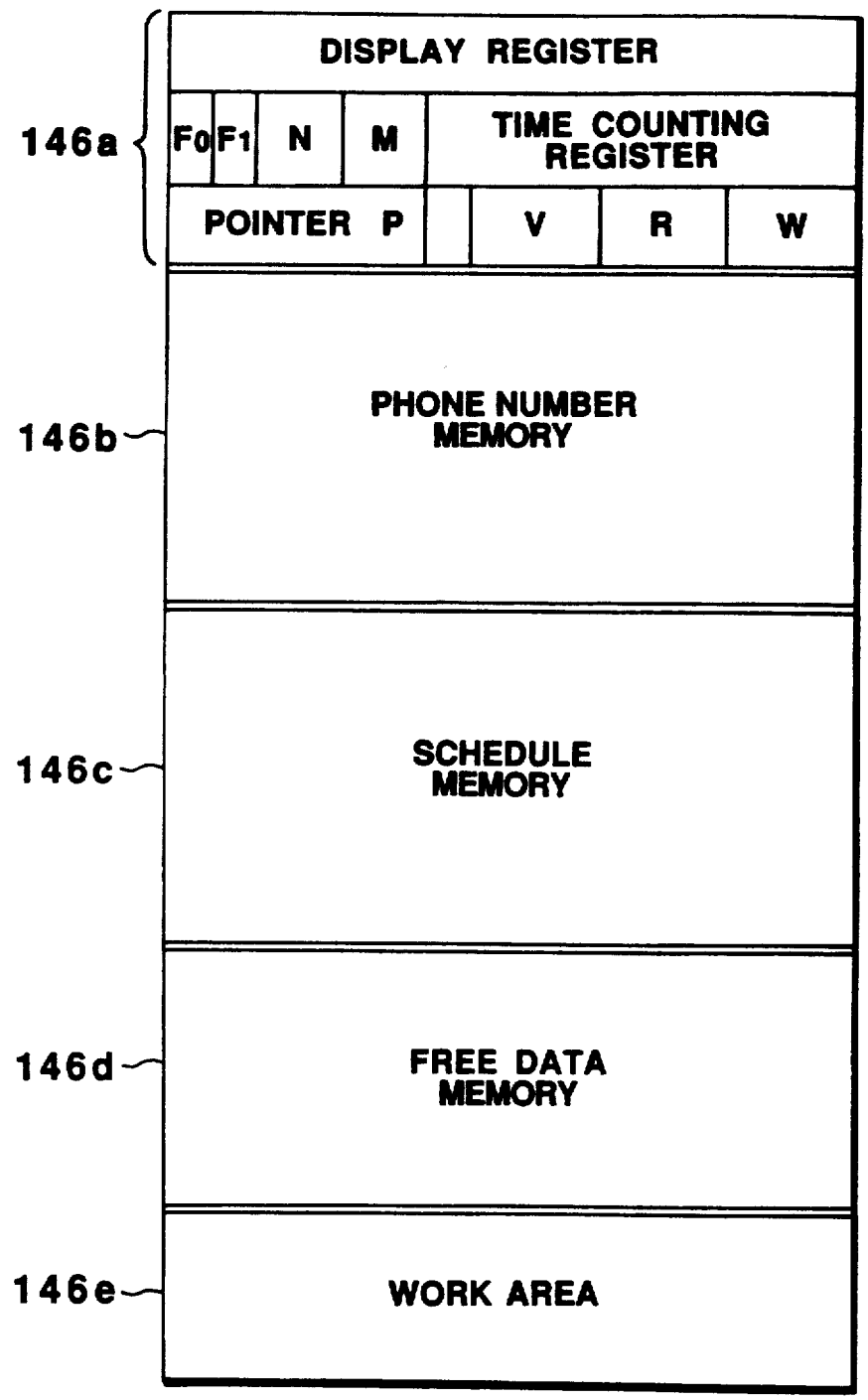
FIGS. 22 through 25 are views showing a third embodiment of the present invention.
Figure 23:
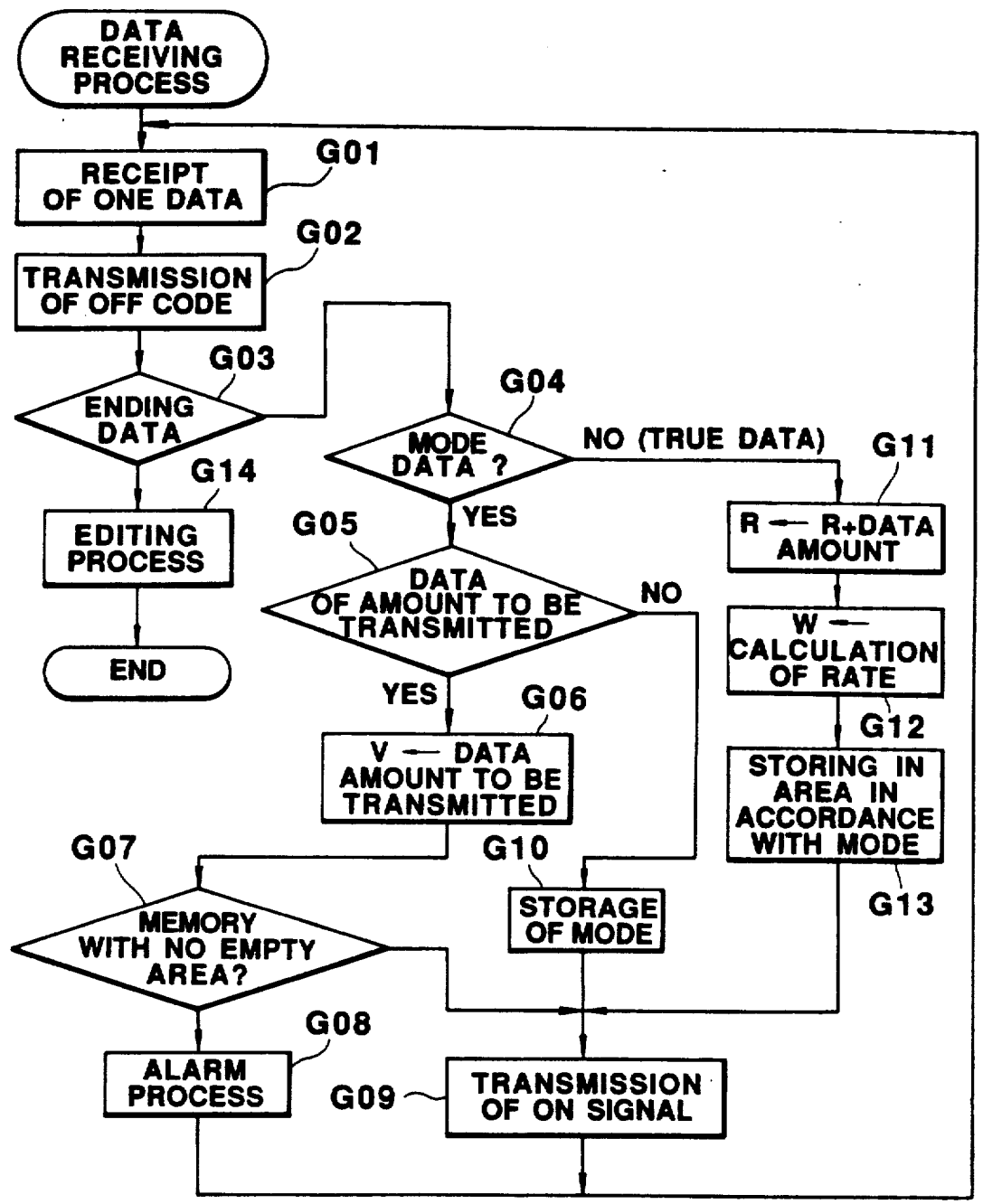
Figure 24:
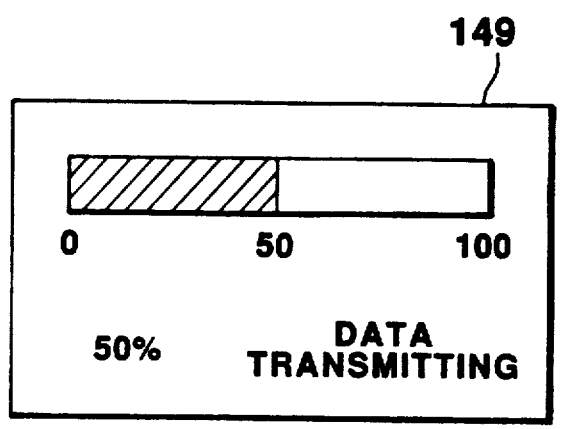
Figure 25:
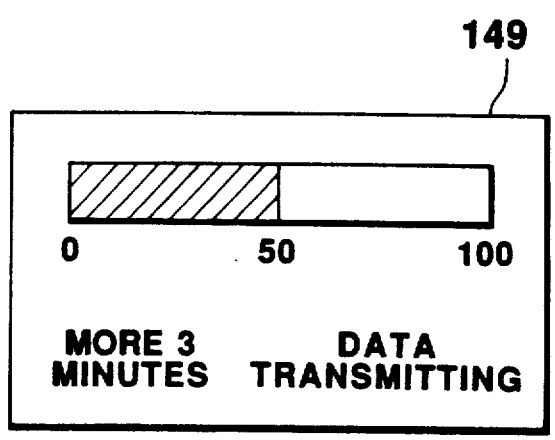

FIGS. 22 through 25 are views showing the third embodiment of the present invention. The third embodiment employs a wrist watch of a shape shown in FIG. 1 and the electronic circuit shown in FIG. 14. RAM 146 of FIG. 14 is constructed as shown in FIG. 22. The present embodiment performs operations as shown in FIGS. 23 to 25 under control of a micro-program stored in ROM 145.

Detailed construction of RAM 146 is shown in FIG. 22. RAM 146 comprises a register area 146a, phone number memory 146b, schedule memory 146c, free data memory 146d and work area 146e. The construction of RAM 146 is almost similar to that shown in FIG. 15 except that there are provided additional registers such as V register, R register and W register in the register area 146a.

V register serves to hold "total data" indicating total amount of data, which "total data" will be transmitted at the beginning of the data transmission. R register renews and holds data amount of data which have been received. W register holds the rate expressed in percent of the data amount held in R register to the value held in V register.

The whole operation of the present embodiment is the same as that shown in FIG. 18 and the data receiving process at step C02 is described in detail in FIG. 23 in addition to FIG. 18.

FIG. 23 shows a detail of the data receiving process. The data receiving process starts with data receiving operation performed in synchronism with ON code signal transmitted from the external appliance. At step G01, the control section 143 receives one data block and holds it temporarily in the work area 146e of RAM 146, and goes to step G02, where the control section 143 delivers OFF code signal to the external appliance to inform of receipt of one data block. Receiving OFF code signal, the external appliance refrains from transmitting the following data until it receives the next ON code signal. At step G03, it is judged if a transmitted data block is the ending data which is added to a series of data to be transmitted at their tail, i.e, if the mode data code D in the data block shown in FIG. 16 is "01". When the result of the judgment is "NO", the operation goes to step G04, where it is judged if the transmitted data block is mode data which is disposed at the leading portion or at the second position of the transmitted data, i.e., if the mode data code D in the transmitted data block is "02". When it is judged that the mode data code D is "02" and the transmitted data block is the mode data, the operation goes to step G05, where the control section 143 reads out data E in the transmitted data block and judges if the data E is the "total data" indicating the total amount of the following transmitted data. When it is judged that the data E is the "total data", the operation goes to step G06, where the data E or the "total data" is set to V register in the register area 146a. Then, it is judged at step G07 if there is left empty area in RAM 146 enough for storing the whole transmitted data. When it is judged at step G07 that the empty area in RAM 146 is not enough for storing the whole transmitted data, the control section 146 gives an alarm at step G08 that the memory is not left for storing the following data by sounding a buzzer or an indication, since the following data are not allowed to be stored in the memory. When it is judged at step G07 that the empty area in RAM 146 is enough for storing the whole transmitted data, the operation goes to step G09, where the control section 143 transmits ON coded signal to the external appliance for causing it to transmit the following data block. Then the operation returns to step G01, again.

The control section 143 receives the mode data, i.e., the second data block at step G01 and holds the received data in the work area 146e in RAM 146. At step G02, the control section transmits OFF code signal and judges at step G03 if it is the ending data. When it is judged at step G03 that it is not the ending data, it is judged at step G04 that the received data is not the mode data and further it is judged at step G05 that the data E is not the "total data". The data E serves to indicate what mode data the following true data is. The operation goes to step G10, where the content of the data E is set to the mode register M in the register area 146a. If the mode data E has its content indicating the phone number mode, a value "1" is set to the mode register M. If the mode data E has its content indicating the schedule mode, a value "2" is set to the mode register M. While if the mode data E has its content indicating the free data mode, a value "3" is set to the mode register M. Thereafter, at step G09 the control section 143 transmits ON code signal to the external appliance to cause it to deliver the following data block and the operation returns to G01, again.

At step G01, the control section 143 receives one data block of true data following the mode data and holds the received data in the work area 146e in RAM 145. At step G02, the control section 143 transmits OFF code signal and judges at step G03 that the received data block is not the ending data. Then, when it is judged at step G04 that the received data is not the mode data, the received data will be true data. Further, the operation goes to step G11, where the amount of data of the data block is added to the content of R register of the register area 146a. Ate step G12, the renewed content of R register and the whole transmitted data set in V register are compared to obtain the rate in percent indicating how much data have been transmitted and the result of the comparison is set to W register in the register area 146a. At step G13, a state of the data transmission is displayed on the display section 149 in accordance with the obtained rate as shown in FIG. 24 and at the same time N bytes in data E of the data block held in the work area 146e are stored in an empty area in any one of the phone number memory 146b, the schedule memory 146c and free data memory 146d in accordance with the mode designated by the content of the mode register M.

FIG. 24 is a view showing an indication of a bar chart with a full scale 100% and with characters "under transmission", which indication visually indicates a state of the data transmission together with a round number in percent.

After indicating a state of data transmission and storing data, the control section 143 transits ON code signal to the external appliance to cause it to deliver the following data block and returns to step G01 again. Thereafter, the control section 143 repeatedly performs the above processes every receipt of a data block of true data to successively store the received data block in one of the phone number memory 146b, the schedule memory 146c and free data memory 146d in RAM 146 in accordance with the mode designated by the mode data while the control section 143 increments the content of R register and calculates the rate in percent of data transmission from the content of R register and the amount of the whole transmitted data set in V register and further sets the calculation result in W register in the register area 146a and displays it on the display section 149.

The control section 143 finishes receiving data blocks of true data and receives the ending data. Receiving the data blocks at step G01, and transmitting OFF code signal at step G02, the control section 143 judges that the received data block is the ending data and goes to step G14, where the editing process is reformed for editing the memory storing the data in accordance with the content of the mode register M. When the content of the mode register M is "1" and the received data are the phone number data, then phone number data stored in the hone number memory 146b are re-arranged in alphabetical order of name data involved in the phone number data in the editing process. When the content of the mode register M is "2" and the received data are schedule data, schedule data stored in the schedule memory 146c are re-arranged in order of data involved in the schedule data in the editing process. In this manner, even though data previously stored in the respective memory are disturbed at receipt of a new data, data involving the new data are re-arranged in the editing process. At completion of the editing process, the receiving process of FIG. 23 is finished.

At step G13, the rate of the received data to the whole data to be transmitted is calculated and displayed in a bar chart and in a numeral as shown in FIG. 24, but a time required to transmit the remaining data may be calculated using a data transmitting speed and may be displayed, for example as "about 3 minutes required" as shown in FIG. 25.

Fourth Embodiment

Now, a fourth embodiment of the present invention will be described hereafter.

Figure 26:
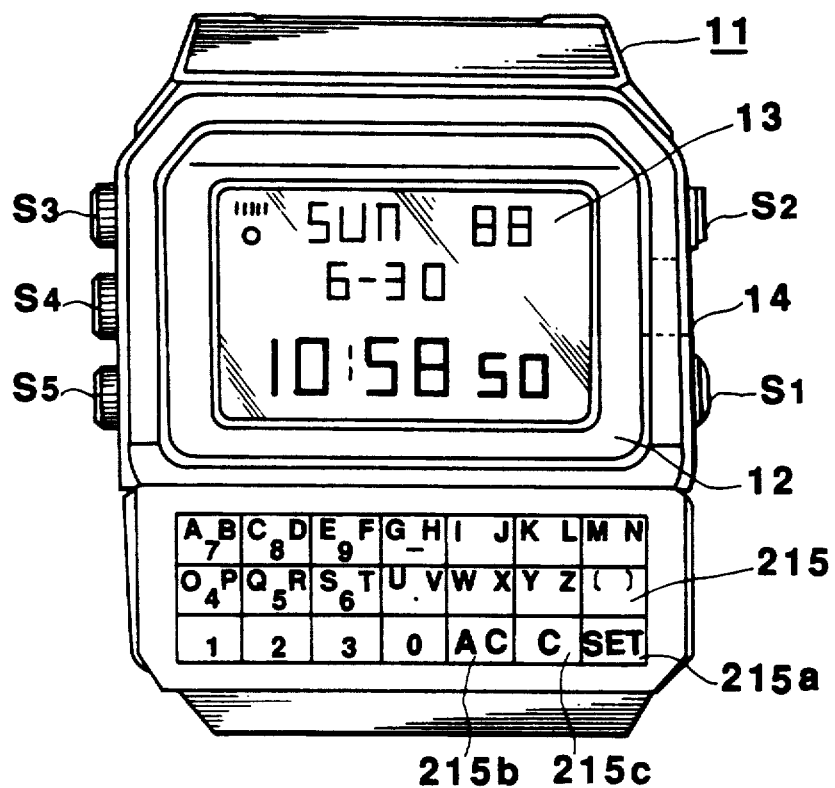
FIGS. 26 through 30 are views showing a forth embodiment of the present invention.

FIG. 26 is a view showing an electronic wrist watch of the fourth embodiment which is almost similar to the wrist watch shown in FIG. 12 except that it is provided with an input-key group 215 involving a number of input keys in place of the switches S6 to S9 for inputting character data and numerical data. The input-key group 215 comprises character keys for inputting data expressed in characters, numerals and symbols, a set key 215a for setting entered data, all clear (AC)key 215b for clearing all of stored data and a clear (C) key 215c for clearing a data memory of displayed data.

Figure 27:
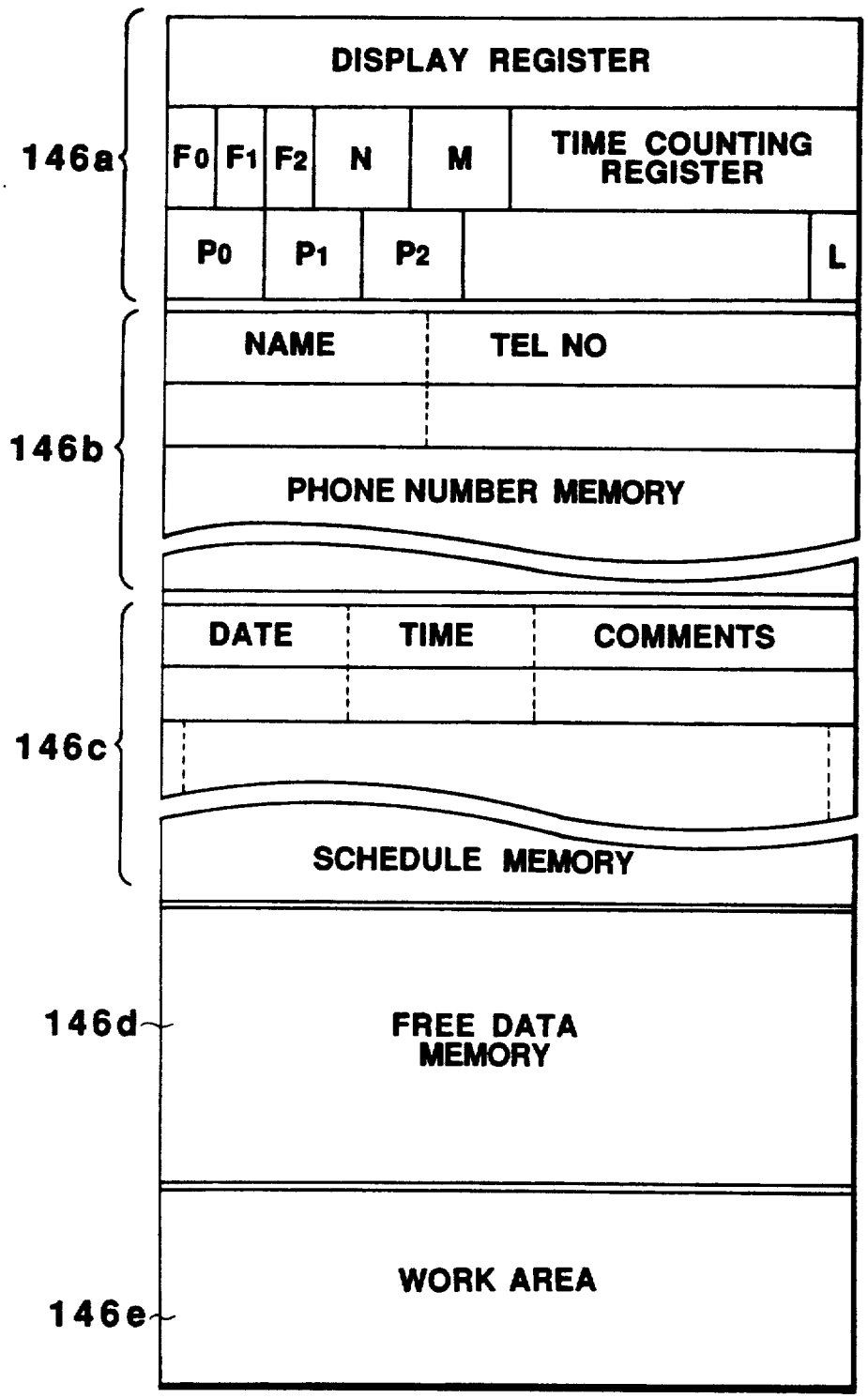

An electronic circuit of the fourth embodiment is similar to that of FIG. 14 except a construction of RAM 146 and a control of ROM 145. FIG. 27 is a view showing a detailed construction of RAM 146. RAM 146 comprises a register area 146a, a phone number area 146b, a schedule memory 146c, a free data memory 146d and a work area 146e.

Further, the register area 146a comprises a display register, F0 register, F1 register, F2 register, N register, a mode register M, a time counting register, P0 register, P1 register, P2 register and L register. The display register serves to hold display data or data to be displayed on the display section 149. F0 register is a flag which takes a value "1" when the data receiving mode has been set. F1 register is a flag which takes a value "1" when the data transmitting mode has been set and F2 register is a flag which takes a value "1" when the data setting mode has been set.

N register is for judging amount of data to be transmitted in the data transmitting mode. N register takes a value "0" when all the data stored in the phone number data memory 146b, the schedule memory 146c and free data memory 146d are transmitted and takes a value "1" when all the data stored in one of the phone number memory 146b, the schedule memory 146c and free data memory 146d are transmitted and further takes a value "2" when only one data is transmitted.

The mode register consists of a divided-by-four counter. The count number or the mode data of the mode register M takes a value "0" when time data is displayed, takes a value "1" when phone number data is displayed, takes a value "2" when schedule data is displayed and takes a value "3" when free data is displayed. The mode register M takes one of these values in turn every renewal.

The time counting register serves to renew and hold a present date data as well as a present time data. P0 register is a pointer which address the phone number memory 146b. P1 register is a pointer which addresses the schedule memory 146c and P2 register is a pointer which addresses the free data memory 146d.

L register is a register which holds a blinking flag, which will be described later.

The phone number memory 146b is a memory which stores a plurality of phone number data including sets of phone number and name in alphabetical order of the name.

The schedule memory 146c is a memory which stores a plurality of schedule data including sets of name, phone number and comment in order of time.

The free data memory 146d is a memory for storing free data in order of entrance of data.

Figure 28:
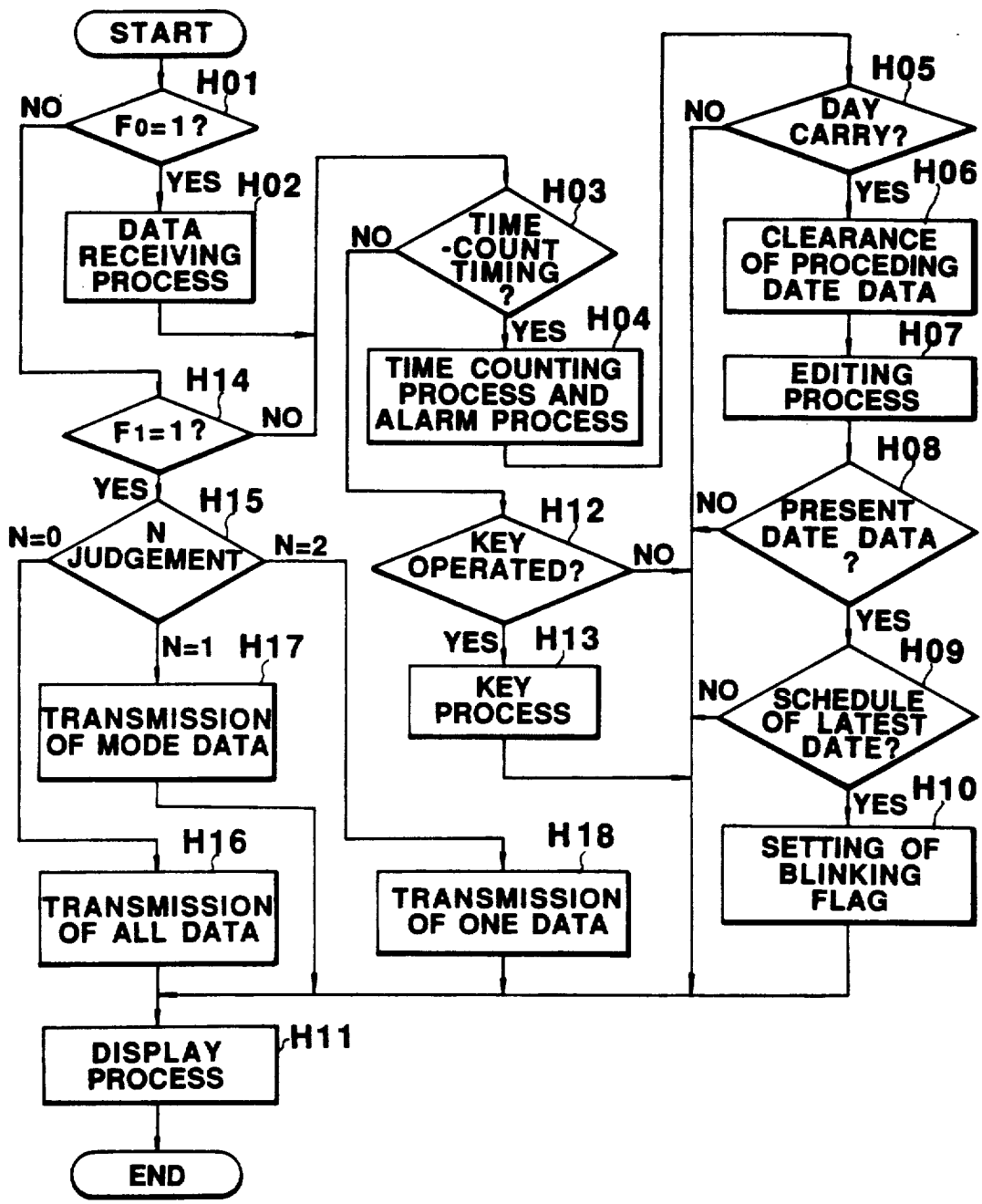

FIG. 28 is a flow chart of the whole processes performed by the fourth embodiment. At step H01, it is judged if a flag "1" indicating the data receiving mode has been set to F0 register in the register area 146a of RAM 146. When it is judged that a flag"1" has been set to F0 register, the operation goes to step H02 since it is judged that the data receiving mode has been set. At step H02, the data receiving process is performed.

The data receiving process will be described in detail with reference to FIG. 29. In the data receiving process, the process starts receiving data in synchronism with ON code signal supplied from the external appliance.

At step J01, the control section 143 receives and stores temporarily one data block in the work area 146e of RAM 146. At step J02, the control section 143 sends OFF code signal to the external appliance, informing that one data block has been received. Receiving OFF code signal, the external appliance refrains from delivering the following data block until it receives the next ON code signal. It is judged at step J03 if the transmitted data block is the ending data attached to the tail portion of a series of transmitted data, or if the mode data code D in the data block of FIG. 16 is "01". When the result of the judgment is "NO", the operation goes to step J04. It is judged at step J04 if the data block is the mode data disposed at the leading portion of the transmitted data, or it is judged if the mode data code D in the transmitted data block is "02". When it is judged that the mode data code D is "02" and the transmitted data block is the mode data, the operation goes to step J05, where data E involved in the transmitted data block is read out and it is judged which mode the content of the read out data E indicates and further the result of the judgment is set to the mode register M. When the content of the data E indicates the phone number mode, then a value "1" is set to the mode register M. When the content of the data E indicates the schedule mode, then a value "2" is set to the mode register M. When the content of the data E indicates the free data mode, then a value "3" is set to the mode register M. At step J06, the control section 143 sends ON code signal to the external appliance to cause it to deliver the next data block and returns to step J01 again.

At step J01, the control section 143 receives one data block of true data following the mode data and stores it in the work area 146e of RAM 146. The control section 143 sends OFF code signal to the external appliance at step J02 and judges at step J03 that the delivered data block is not the ending data. Thereafter, judging at step J04 that the delivered data block is not the mode data, the control section 143 goes to step J07 since the delivered data block is true data. At step J07, the control section 143 successively stores N bytes in the data E involved in the delivered data block of true data in an empty area next to the area with data stored in any one of the phone number memory 146b, the schedule memory 146c and the free data memory 146d in accordance with the content of the mode register M.

Storing data in a pertinent area at step J07, the control section 143 sends ON code signal to the external appliance to cause it to deliver the following data block at step J06 and returns to step J01 again.

Thereafter, the control section 143 repeatedly performs the above processes every receipt of data block of true data, thereby successively storing data in any one of the phone number memory 146b, the schedule memory 146c and the free data memory 146d in accordance with the content of the mode register M.

Finishing receipt of data blocks of true data, the control section 143 receives the ending data. The control section 143 receives the data block at step J01 and sends OFF code signal to the external appliance at step J03. Then, the control section 143 judges that the received data block is the ending code data and goes to step J08. At step J08, the control section 143 judges the memory in which the true data is stored at step J07, i.e., judges the content of the mode register M of the register area 146a and it performs the editing process to re-arrange the stored data in a predetermined order, if necessary, thereby making order of data arrangement, which was disturbed by a newly received data.

If the above data-storing process is performed for the phone number memory 146b, the phone number data are re-arranged in alphabetical order of name involved in the phone number data and if the above data-storing process is performed for the schedule memory 146c, the schedule data are re-arranged in order of date involved in the schedule data. But the above data-storing process is performed for the free data memory 146d, then no process for re-arrangement of data is performed.

Figure 29:
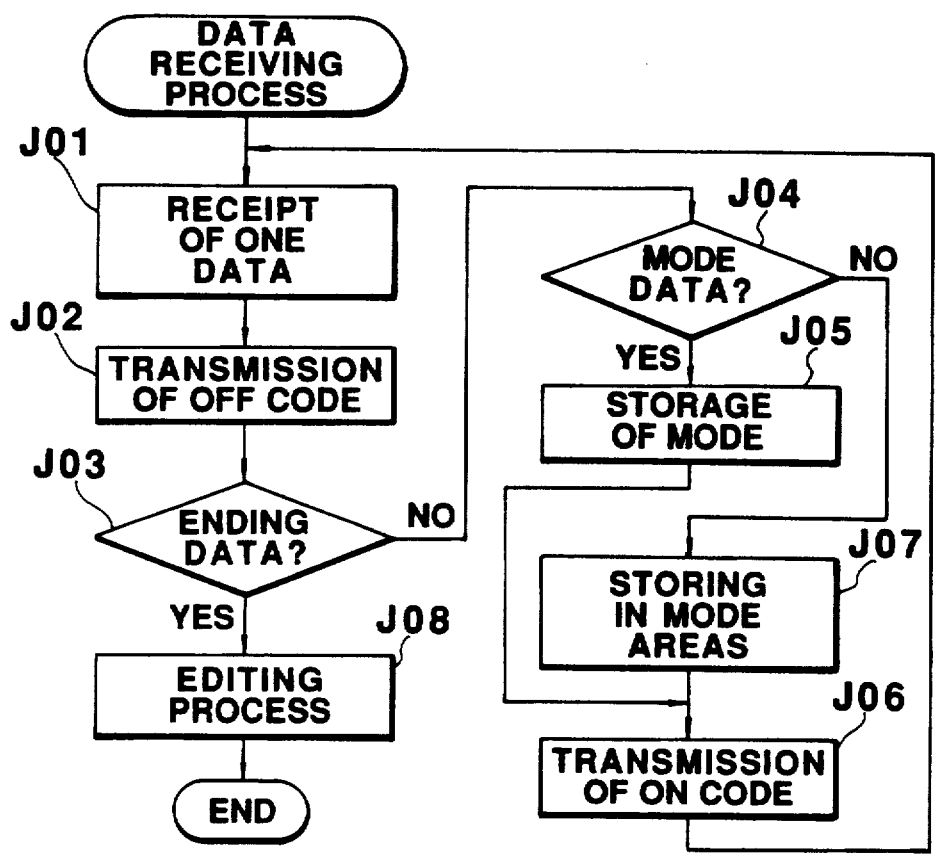

After completion of the editing process at step J08 in the above described manner, the data receiving process of FIG. 29 is finished.

When the data receiving process of FIG. 29 is finished, the operation goes from step H02 to step H03 of FIG. 28. At step H03, it is judged if it is a time for time or the timing signal has been delivered from the dividing/timing signal section 142. When it is judged that it is a time for time counting, the operation goes to step H04, where the time counting process is performed. In the time counting process, the content of the time counting register of the register area 146a is renewed and present time data is renewed. At the same time, if in the time display mode display data or time data held in the display register is also renewed and an alarm process is performed simultaneously.

In the alarm process, a plurality of schedule data stored in the schedule memory 146c are compared with present date data present time data stored in the time counting register and if schedule data including the same date data and time data as the above present date and time data have been found, the control section 143 supplies a driving signal to a buzzer driving circuit, causing it to sound alarm.

At step H05, it is judged if renewal of date is necessary in accordance with renewal of time data or it is judged if a date carry signal is generated. If renewal of date is necessary, the operation goes to step H06, where schedule data including date data of past date is removed from the schedule memory 146c (clearing process) since the schedule data is not necessary any more. Following the clearing process, data in the schedule memory 146c are edited at step H07. At step H08, data in the schedule memory 146c are searched with respect to the renewed date data to locate schedule data including pertinent date data. When the schedule data including the pertinent date data has been located, the operation goes to step H09, where it is judged if the date data included in the above schedule data is the latest one included in the schedule data stored in the schedule memory 146c. When it is judged that the above date data is not the latest one, it is judged that another schedule data are still stored in the schedule memory 146c, remaining no problem. When it is judged that the above date data is the latest one, the operation goes to step H10, where a flag "1" is set to the blinking flag register L in the register area 146a since another schedule data should be entered.

After the process is performed at step H10 or after it is judged "NO" at steps H05, H08 and H09 respectively, the display process is performed at step H11. The display process is performed in accordance with the content of the mode register M in the register area 146a. For example, if M="0", the present date and the present time stored in the time counting register are displayed. If M="1", data stored in the memory 146a addressed by P0 pointer is displayed and if M="2", data stored in the memory 146b addressed by P1 pointer is displayed. Further, if M="3", data stored in the memory 146c addressed by P2 pointer is displayed. In these cases, when a flag "1" has been set to the blinking flag register L, data is displayed in a blinking manner, giving an alarm that another schedule data should be entered.

When it is judged at step H03 that it is not a time for time counting, the operation goes to step H12, where it is judged if push button switches S1 through S5 involved in the key input section 144 or the input key group 215 have been operated to enter a key input signal. When no key input signal is entered, the operation goes to step H11. When a key input signal is entered, the operation goes to step H04, where a key process is performed in accordance with the key input signal.

Figure 30:
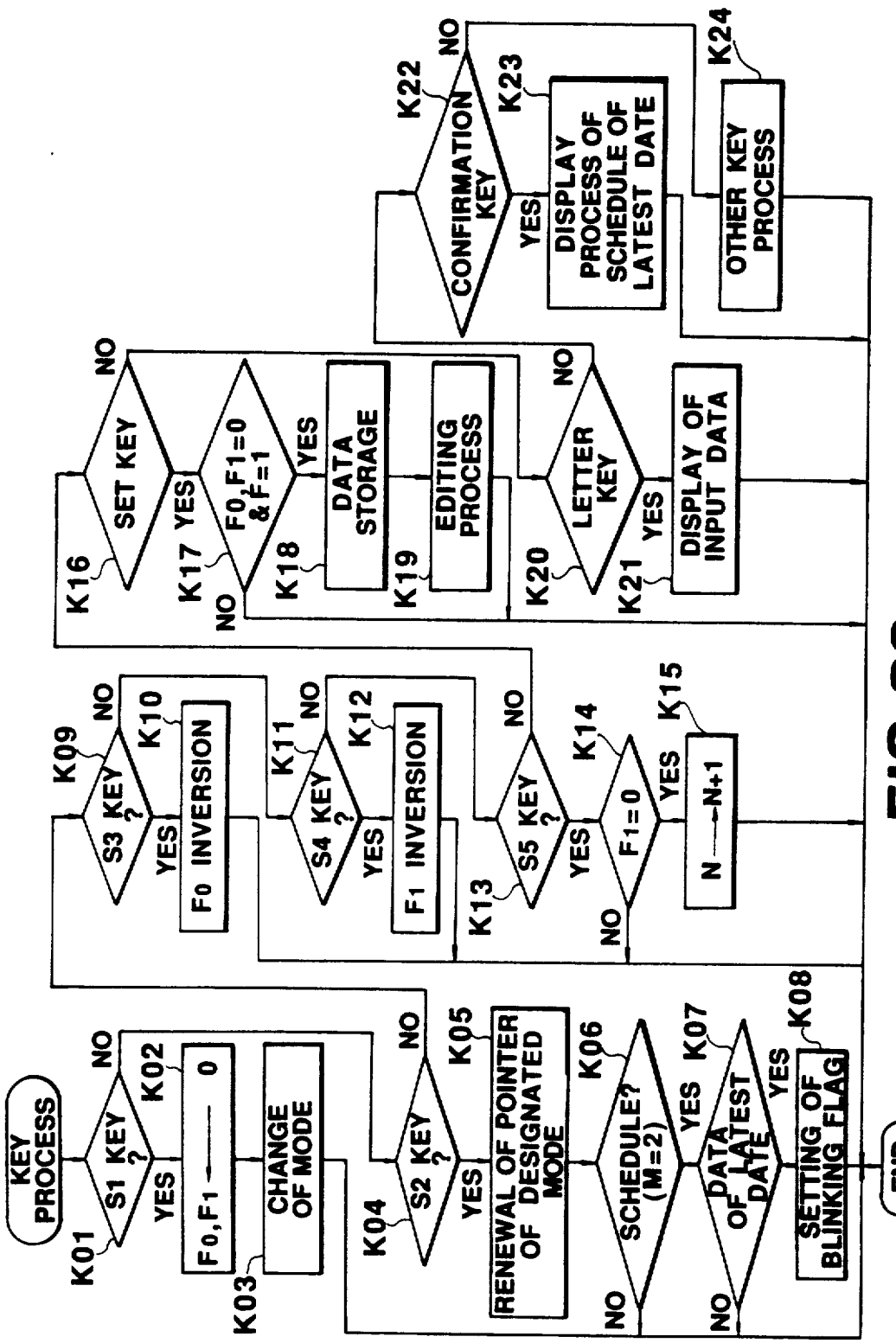

FIG. 30 is a view showing the key process in detail. At step K01, it is judged if the push button switch S1 has been operated. The push button switch S1 is used for changing a mode and when it is judged that the push button switch S1 has been operated, the operation goes to step K02. At step K02, F0 register and F1 register of the register area 146a in RAM 146 are cleared and are set to a value "0" and then operation goes to step K03, where the content of the mode register M is advanced by "+1". After the process is performed at step K03, the key process is finished. When it is judged that a switch other than the push button switch S1 has been operated, the operation goes to step K04, where it is judged if the push button switch S2 has been operated. The push button switch S2 is used to sequentially change data to be displayed in the same mode. When it is judged that the push button switch S2 has been operated, the operation goes to step K05, where the content of one of P0 through P2 register in the register area 146a, which is designated by the mode register M, is advanced by "+1". For example, if the mode register M is set to "1", indicating the phone number data, the content of P0 register is advanced by "+1" while the mode register M is set to "2", indicating the schedule data, the content of P1 register is advanced by "+1". At K06, it is judged if the mode register M has been set to "2" or if the schedule data mode has been set. When it is judged that the schedule data mode has not been set, the process is finished. When it is judged that the schedule data mode has been set, the operation goes to step K07, where it is judged if date data of the memory 146b addressed by the renewed content of P1 register has been set to a value indicating the schedule data of the latest date. When it is judged that the date data of the memory 146b has not been set to the value indicating the schedule data of the latest date, the process is finished. When it is judged that the date data of the memory 146b has been set to the value indicating the schedule data of the latest date, a flag "1" is set to the blinking flag register in the register area 146a, giving an alarm, and the process is finished.

At step K04, it is judged if a key other than the push button switch S2 has been operated, the operation goes to step K09, where it is judged if the push button switch S3 has been operated. When it is judged that the push button switch S3 has been operated, the operation goes to step K10, where the control section 143 inverses the content of F0 register in the register area 146a from "0" to "1" or from "1" to "0" and the process is finished.

When it is judged at step K09 that a key other than the push button switch S3 has been operated, it is further judged at step K11 if the push button switch S4 has been operated. When it is judged that the push button switch S4 has been operated, the operation goes to step K12, where the control section 143 inverses the content of F1 register in the register area 146a from "0" to "1" or from "1" to "0" and the process is finished.

When it is judged at step K11 that a key other than the push button switch S4 has been operated, it is further judged at step K13 if the push button switch S5 has been operated. The push button switch S5 is used for judging volume of data to be transmitted. When it is judged that the push button switch S5 has been operated, the operation goes to step K14, where it is judged if a flag "1" has been set to F1 register in the register area 146a of it is judged if the transmitting mode has been set. When the transmitting mode has not been set, the operation of the push button switch S5 is ignored and the process is finished. When the transmitting mode has been set, the operation goes to step K15, where the content of N register in the register area 146a is advanced by "+1". N register consists of a divided-by-three counter. When N register is set to a value "0", all the phone number data, schedule data and free data are transmitted. When N register is set to "1", any one of the phone number data, schedule data and free data are transmitted. When N register is set to "2", only one data being displayed is transmitted. After N register has been set to a pertinent value, the process is finished.

When it is judged at step K13 that a key other than the push button switch S5 has been operated, it is further judged at step K16 if a set key 215a of the input key group 215 has been operated or if data is set after data is entered by operation of the input key group 215. When it is judged that the set key 215a has been operated, the operation goes to step K17, where it is judged if both F0 register and F1 register in the register area 146a of RAM 146 have been set to a value "0" and F2 register has been set to a value "1". That is, it is judged at step K17 if the data setting state has been set in the mode other than the data receiving mode and the data transmitting mode. In case that one of F0 register and F1 register has been set to a value "1" or F2 register has been set to a value "0", the operation of the set key 215a is ignored and the process is finished. In case that both F0 and F1 register have been set to a value "0" and F2 register has been set to a value "1", the operation goes to step K18, where data input by the input key group 215 and stored in the display register of the register area 146a is stored in an area in one memory which is selected or designated from the phone number memory 146b, schedule memory 146c and free data memory 146d by the mode register M. In the editing process of step K19, data stored in the memory are re-arranged in a predetermined order, and thereby the data arrangement is made in the memory again, which was disturbed by newly received data and the process is finished.

When it is judged at step K16 that a key other than the set key 215a has been operated, it is further judged at step K20 if letter keys of the input key group 215 have been operated or it is judged if data is entered by operation of the input key group 215. When it is judged that the letter keys have been operated, the operation goes to step K21, where the control section 143 holds entered character data in the display register in the register area of RAM 146 and it indicates an entrance of character data on the display section 149 by using the content of the display register, and the process is finished.

When it is judged at step K20 that a key other than the letter key of the input key group 215 has been operated, it is further judged at step K22 if a confirmation key (not shown) of the input key group 215 has been operated or it is judged if a key input signal has been entered to confirm whether date data and time data involved in the schedule data stored in the schedule memory 146c are the latest data. When it is judged that the confirmation key has been operated, the operation goes to step K23, where the control section 143 reads out the schedule data which has been disposed at the tail portion of a plurality of schedule data stored in the schedule memory 146c in the editing process and it displays the read out schedule data on the display section 149, and the process is finished.

When it is judged at step K22 that a key other than the confirmation key of the input key group 215 has been operated. A pertinent process corresponding to the operation of the operated key is performed at step K24 and the processes of FIG. 30 are finished. When key processes corresponding to operations of the push button switches S1 through S5 of the key input section 144 and the input key group 215 have been finished as described above, the operation goes to step H11 of FIG. 28, where the display process in accordance with the performed key process is performed and then the operation is finished.

In case that a flag "1" has been set to the blinking flag register L in the register area 146a at step K08, schedule data is displayed in a blinking manner, giving an alarm that the displayed data is the schedule data of the latest date data, which has been addressed by the pointer of P1 register in response to operation of the push button switch S2.

When it is judged at step H12 that a key other than the push button switches S1 through S5 of the key input section 144 and the input key group 215 has been operated, the operation goes to step H11, where the display process is performed, and the process of FIG. 28 is finished.

Now, operation performed when data are transmitted will be described.

In FIG. 28, when it is judged at step H01 that F0 register of register area 146a has been set to "0" and the data receiving mode has not been set, the operation goes to step H14, where if a flag "1" has been set to F1 register or if the data transmitting mode has been set. When the data transmitting mode has not been set, then the data transmitting process is not performed and the operation goes directly to step H03, where the time counting process, the key process and/or the display process is performed, if necessary, and the process is finished.

When it is judged at step H14 that a flag "1" has been set to F1 register and the data transmitting mode has been set by operation of the push button switch S4, the operation goes to step H15, where the control section 143 confirms the content of N register of the register area 146a. N register is used to judge volume of data to be transmitted as described above. When it is judged that the content of N register is "0", the operation goes to step H16, where all the data held in the phone number memory 146b, the schedule memory 146c and the free data memory 146d in RAM 146 are successively read out and delivered to the communication circuit section 147. The communication circuit section 147 combines the delivered data into a data block as shown in FIG. 16 and transmits the data block to the external appliance 150. At step H11, the display process is performed to indicate that data are transmitted to the external appliance 150, and the processes of FIG. 28 are finished.

When it is judged at step H15 that N register has been set to a value "1", the operation goes to step H17, where all the data held in the memory selected by the content of the mode register M from among the phone number memory 146b, the schedule memory 146c and the free data memory 146d in RAM 146 are successively read out and delivered to the communication circuit section 147. The communication circuit section 147 combines the delivered data into a data block as shown in FIG. 16 and transmits the data block to the external appliance 150. At step H11, the display process is performed to indicate that data are transmitted to the external appliance 150, and the processes of FIG. 28 are finished.

When it is judged at step H15 that the content of N register is "2", the operation goes to step H18, where only one selected the data held in the display register of RAM 146 is transferred to the communication circuit section 147. The communication circuit section 147 transmits the transferred data to the external appliance 150. At step H11, the display process is performed to indicate that data are transmitted to the external appliance 150, and the processes of FIG. 28 are finished.

The present embodiment may be arranged such that it gives an alarm that the present date data coincides with a predetermined day (for example a few days) prior to the latest date included in the schedule data stored in the schedule memory 146c, or the present data falls within a week including or prior to the above latest date.

In the above embodiments, the electronic note book 21 has been described by way of example as the external appliance 150 to be connected thereto but other various devices such as a personal computer with a floppy disk device but another wrist watch may be used in combination with the present invention apparatus. The invention apparatus is not limited to the wrist watch with functions as an electronic note book as described in the above embodiments but a handy type of an electronic note book of a size to be carried in the pocket may be used to provide the present inventive features.

In the above embodiments, a wiring system is used for transmission and/or receipt of data but another system such as a wireless or a radio system and a system using infrared rays and/or ultrasonic waves may be used in combination with the present invention apparatus.

What is claimed is:

1. An electronic apparatus, including an electronic circuit, and having a communication function of receiving and storing in a memory data delivered from an external appliance, said electronic apparatus further comprising:

first oscillation means for generating a first oscillation signal of a frequency $300 \times 2^n$ (where n = 0, 1, 2, 3, ...);

second oscillation means for generating a second oscillation signal, a frequency of the second oscillation signal being higher than that of the first oscillation signal generated by said first oscillation means;

first divider means for dividing the first oscillation signal generated by said first oscillation means to produce a first clock pulse signal to be used for controlling operation of said electronic circuit;

second divider means for dividing the first oscillation signal generated by said first oscillation means to produce a second clock pulse signal to be used for receiving data from the external appliance;

communication means for performing a communication function of receiving data delivered from the external appliance on the basis of the second clock pulse signal produced by said second divider means;

control means for normally performing a control operation on the basis of the first clock pulse signal and for performing a storing operation to store in said memory data received by said communication means on the basis of the second oscillation signal generated by said second oscillation means; and power source circuit means for normally providing a first power source voltage of a given nominal voltage level to all of the means including the electronic circuit, and for providing a second power source voltage to said second oscillation means, to said communication means and to said control means while said second oscillation means is generating the second oscillation signal in a communication mode, said second power voltage having a higher voltage level than that of the first power source voltage.

2. An electronic apparatus according to claim 1, wherein:

said first oscillation means comprises a crystal oscillation circuit means; and said second oscillation means comprises a CR-oscillation circuit means.

3. An electronic apparatus according to claim 1, wherein said first oscillation means includes means for generating an oscillation signal of a frequency 38.4 KHz.

4. An electronic apparatus according to claim 1, wherein said second divider means produces a clock pulse signal of a frequency $300 \times 2^m$ (where m = 1, 2, 3, ...).

5. An electronic apparatus according to claim 1, further comprises:

storage means for storing data received by said communication means; and display means for displaying data stored in said storage means.

6. An electronic apparatus according to claim 1, wherein said power source circuit means comprises:

a battery power source;

voltage decreasing means for decreasing an output voltage of said battery power source;

first voltage output means for providing the first power source voltage in accordance with the decreased output voltage from said voltage decreasing means; and second voltage output means for providing the second power source voltage in accordance with an output voltage from said battery power source.

7. An electronic apparatus according to claim 1, further comprising:

transmission data storing means for storing transmission data; and transmission means for transmitting data stored in said transmission data starting means to the external appliance.

8. An electronic apparatus having a data communication function to receive data delivered from an external appliance, said electronic apparatus comprising:

first oscillation means for generating a first oscillation signal of a predetermined frequency;

second oscillation means for generating a second oscillation signal, a frequency of the second oscillation signal being higher than the predetermined frequency of the first oscillation signal generated by said first oscillation means;

temporary data storing means having a predetermined memory capacity, for temporarily storing data delivered thereto from the external appliance;

large capacity storing means having a memory capacity larger than the predetermined memory capacity of said temporary data storing means, for successively storing data which are temporarily stored in said temporary data storing means;

control means for causing said temporary data storing means to store data delivered thereto from the external appliance on the basis of the first oscillation signal generated by said first oscillation means and for causing said large capacity storing means to store data which are stored in said temporary data storing means on the basis of the second oscillation signal generated by said second oscillation means; and power source circuit means for providing a first predetermined power source voltage of a given nominal voltage level to all of said means, and for providing a second power source voltage to said second oscillation means, to said large capacity storing means and to said control means while said large capacity storing means is carrying out an operation for storing data which are stored in said temporary data storing means on the basis of the second oscillation signal generated by said second oscillation means in a communication mode, said second power source voltage having a higher voltage level than that of said first predetermined power source voltage.

9. An electronic apparatus according to claim 8, wherein:

said first oscillation means comprises a crystal oscillation circuit means; and said second oscillation means comprises a CR-oscillation circuit means.

10. An electronic apparatus according to claim 8, wherein said first oscillation means includes means for generating an oscillation signal of a frequency 38.4 KHz.

11. An electronic apparatus according to claim 8, further comprising display means for displaying data stored in said large capacity storing means.

12. An electronic apparatus according to claim 8, wherein said power source circuit means comprises:

a battery power source;

voltage decreasing means for decreasing an output voltage of said battery power source;

first voltage output means for providing the first power source voltage in accordance with the decreased output voltage from said voltage decreasing means; and second voltage output means for providing the second power source voltage in accordance with an output voltage from said battery power source.

13. An electronic apparatus according to claim 8, further comprising:

transmission data storing means for storing transmission data; and transmission means for transmitting data stored in said transmission data starting means to the external appliance.

* * * * *